United States Patent
Ohishi

(10) Patent No.: US 6,868,131 B2
(45) Date of Patent: Mar. 15, 2005

(54) DEMODULATION APPARATUS, BROADCASTING SYSTEM AND BROADCAST RECEIVING APPARATUS

(75) Inventor: Syouji Ohishi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 806 days.

(21) Appl. No.: 09/907,002

(22) Filed: Jul. 17, 2001

(65) Prior Publication Data

US 2002/0061077 A1 May 23, 2002

(30) Foreign Application Priority Data

Nov. 22, 2000 (JP) ........................................ 2000-355106

(51) Int. Cl.[7] .............................................. H03D 5/00
(52) U.S. Cl. ...................................................... 375/326
(58) Field of Search ................................. 375/326, 327, 375/339, 344, 345, 355, 321, 301; 329/304, 306

(56) References Cited

U.S. PATENT DOCUMENTS

| | | | | |
|---|---|---|---|---|
| 5,602,835 A | * | 2/1997 | Seki et al. .................. | 370/206 |
| 5,646,935 A | * | 7/1997 | Ishikawa et al. ............ | 370/207 |
| 5,673,293 A | * | 9/1997 | Scarpa et al. ............... | 375/321 |
| 5,774,450 A | * | 6/1998 | Harada et al. ............... | 370/206 |
| 6,005,640 A | * | 12/1999 | Strolle et al. ............... | 348/726 |
| 6,032,033 A | * | 2/2000 | Morris et al. ............ | 455/277.2 |
| 6,108,525 A | | 8/2000 | Takemura | |
| 6,147,713 A | * | 11/2000 | Robbins et al. ............. | 348/555 |
| 6,314,083 B1 | * | 11/2001 | Kishimoto et al. ......... | 370/210 |
| 6,385,237 B1 | * | 5/2002 | Tsui et al. .................. | 375/228 |
| 6,545,532 B1 | * | 4/2003 | Maalej et al. ............... | 329/304 |
| 6,590,872 B1 | * | 7/2003 | Shiue et al. ................. | 370/314 |
| 6,717,993 B1 | * | 4/2004 | Shiraishi et al. ............ | 375/329 |

FOREIGN PATENT DOCUMENTS

| | | |
|---|---|---|
| JP | 02203645 | 8/1990 |
| JP | 07297872 | 11/1995 |
| JP | 2000236364 | 8/2000 |

OTHER PUBLICATIONS

Valerie Cueff et al. QML Algorithm near Cramer Rao Bound for Phase and Frequency Estimation. IEEE Vehicular Technology Conference, pp. 586–589,May 2000.

Yi–Pin Eric Wang et al. Initial Frequency Acquistion in W–CDMA. IEEE Vehicular Technology Conference, pp. 1013–1017, Sep. 1999.

D.W.Park, et al. An Asynchronous Digital Demodulator for TDMA. International Conference on Universal Personal Communications, pp. 431–435, Oct. 1993.

Michel Terre et al. QML–MC Algorithm for Frequency Estimation on Multipath Channels. IEEE Vehicular Technology Conference, pp. 1639–1643, May 2001.

* cited by examiner

*Primary Examiner*—Emmanuel Bayard
(74) *Attorney, Agent, or Firm*—Katten Muchin Zavis Rosenman

(57) ABSTRACT

A demodulation apparatus that shortens demodulation time and performs efficient high-quality demodulation control. A digital signal generating section generates digital signals corresponding to phase axes from a modulated input signal. A frequency correction value outputting section outputs a frequency correction value. A frequency correcting section gives a frequency offset to digital signals on the basis of a frequency correction value to generate frequency-corrected signals. A timing recovering section performs timing recovery by extracting symbol timing for frequency-corrected signals. A C/N detecting section detecting C/N from a symbol. An optimum frequency correction value determining section treats a frequency correction value corresponding to the maximum C/N value as an optimum frequency correction value. A carrier recovering section performs carrier recovery by correcting finally a shift in the frequency of a signal on which a frequency correction by the use of an optimum frequency correction value and timing recovery have been made. A synchronization detecting section makes an error correction on a symbol and detects a unique word.

9 Claims, 21 Drawing Sheets

DEMODULATION APPARATUS, BROADCASTING SYSTEM AND BROADCAST RECEIVING APPARATUS

BACKGROUND OF THE INVENTION

1. Field of the Invention

This invention relates to a demodulation apparatus, broadcasting system and broadcast receiving apparatus and, more particularly, to a demodulation apparatus for demodulating modulated signals, a broadcasting system for communicating digital satellite broadcasts and a broadcast receiving apparatus for demodulating modulated signals for a digital satellite broadcast.

2. Description of the Related Art

Phase shift keying (PSK) is one of digital modulation demodulation techniques. PSK is a modulation technique in which a phase is changed as a parameter for a carrier, and is widely used in, for example, the satellite communication field.

FIG. 21 is a view showing the rough configuration of a conventional PSK demodulator. A PSK demodulator 400 comprises a local oscillator 401, multipliers 402a and 402b, a regenerating section 403, a frequency correction value outputting section 404, and a π/2 phase shifter 405.

The local oscillator 401 generates a sine wave the frequency and phase of which are the same as those of a carrier used for modulation on the sending side. The π/2 phase shifter 405 shifts by π/2 the phase of a signal sent from the local oscillator 401. The multiplier 402a calculates the product of an input signal and a signal sent from the local oscillator 401. The multiplier 402b calculates the product of the input signal and output from the π/2 phase shifter 405.

The regenerating section 403 causes the low-frequency components of signals output from the multipliers 402a and 402b to pass through it and makes an A/D conversion on them to generate digital signals corresponding to phase axes. Then the regenerating section 403 makes a frequency correction on the basis of frequency correction value Δf output from the frequency correction value outputting section 404. And then the regenerating section 403 performs timing recovery and carrier recovery and detects a unique word (synchronization code word). (Synchronization is detected when SYNC is "H.") The detection of a unique word means that normal demodulation control has been performed.

In this case, the PSK demodulator 400 uses the local oscillator 401 being independent of the sending side, so it will be impossible to obtain exactly the same frequency and phase. Conventionally, the frequency correction value outputting section 404 outputs frequency correction values in turn until a unique word is detected. The regenerating section 403 performs frequency correction, timing recovery, and carrier recovery each time it receives a frequency correction value. Input signals have been demodulated by performing such feedback control.

However, when a modulation frequency for an input signal and the oscillation frequency of the local oscillator 401 differ significantly, demodulation by the conventional PSK demodulator 400 described above will take a long time and degrade signal quality.

At first, a frequency correction value is zero. After waiting for time $T_{TMAX}$ (s) which a timing recovering circuit needs to lock, the regenerating section 403 in the PSK demodulator 400 begins carrier recovery. Then the regenerating section 403 begins to detect a unique word after waiting for time $T_{CMAX}$ (s) which a carrier recovering circuit needs to lock. The locking of a unique word detecting circuit (it needs time $T_{FMAX}$ (s) to lock) means that a unique word is detected. As a result, SYNC will turn to "H."

If SYNC is "L," then the frequency correction value outputting section 404 updates frequency correction value Δf (Hz) and repeats the above operation. Usually a frequency correction value will be updated in turn to values (0→ΔA→-ΔA→2ΔA→-2ΔA→3ΔA→-3ΔA→ . . . , for example) set in advance on the basis of a symbol rate.

A cycle during which a frequency correction value is updated is given by $T_{TMAX}+T_{CMAX}+T_{FMAX}$. Therefore, when a modulation frequency for an input signal and the oscillation frequency of the local oscillator 401 differ significantly, time $T_{TMAX}+T_{CMAX}+T_{FMAX}$ will be repeated many times until synchronization is detected. That is to say, in this case, demodulation takes a long time.

SUMMARY OF THE INVENTION

In order to address such a problem, the present invention was made. In other words, an object of the present invention is to provide a demodulation apparatus that shortens demodulation time and performs efficient high-quality demodulation control.

Another object of the present invention is to provide a broadcasting system that shortens demodulation time on the receiving side and performs efficient high-quality broadcasting communication.

Still another object of the present invention is to provide a broadcast receiving apparatus that shortens demodulation time and performs efficient high-quality broadcast receiving control.

In order to achieve the above first object, a demodulation apparatus for demodulating modulated signals is provided. This demodulation apparatus comprises a digital signal generator for performing synchronous detection of a modulated input signal and for making an A/D conversion to generate digital signals corresponding to phase axes, a frequency correction value outputting unit for outputting a frequency correction value set on the basis of a symbol rate, a frequency corrector for giving a frequency offset to the digital signals on the basis of the frequency correction value to generate frequency-corrected signals, a timing recovering unit for performing timing recovery by extracting symbol timing for the frequency-corrected signals, a C/N detector for detecting C/N from a symbol obtained by the timing recovering unit, an optimum frequency correction value determining unit for treating a frequency correction value corresponding to the maximum value of the C/N as an optimum frequency correction value, a carrier recovering unit for performing carrier recovery by correcting finally a shift in the frequency of a signal on which a frequency correction by the use of the optimum frequency correction value and timing recovery have been made, and a synchronization detector for making an error correction on a symbol after carrier recovery and for detecting a unique word.

In order to achieve the above second object, a broadcasting system for communicating digital satellite broadcasts is provided. This broadcasting system comprises a broadcast sending apparatus including a modulator for modulating a signal to be sent to generate a modulated signal, an up converter for converting the modulated signal to a radio signal, and a sending unit for sending the radio signal to a satellite via an antenna and a broadcast receiving apparatus including a receiving unit for receiving a signal sent from the satellite to the ground, a down converter for converting the frequency of a signal received to generate a signal to be demodulated, a digital signal generator for performing synchronous detection of a signal output from the down converter which was modulated on the sending side and for making an A/D conversion to generate digital signals corresponding to phase axes, a frequency correction value outputting unit for outputting a frequency correction value set on the basis of a symbol rate, a frequency corrector for giving a frequency offset to the digital signals on the basis of the frequency correction value to generate frequency-corrected signals, a timing recovering unit for performing timing recovery by extracting symbol timing for the frequency-corrected signals, a C/N detector for detecting C/N from a symbol obtained by the timing recovering unit, an optimum frequency correction value determining unit for treating a frequency correction value corresponding to the maximum value of the C/N as an optimum frequency correction value, a carrier recovering unit for performing carrier recovery by correcting finally a shift in the frequency of a signal on which a frequency correction by the use of the optimum frequency correction value and timing recovery have been made, and a synchronization detector for making an error correction on a symbol after carrier recovery and for detecting a unique word.

In order to achieve the above third object, a broadcast receiving apparatus for demodulating modulated signals for a digital satellite broadcast is provided. This broadcast receiving apparatus comprises a receiving unit for receiving a signal sent from a satellite to the ground, a down converter for converting the frequency of a signal received to generate a signal to be demodulated, a digital signal generator for performing synchronous detection of a signal output from the down converter which was modulated on the sending side and for making an A/D conversion to generate digital signals corresponding to phase axes, a frequency correction value outputting unit for outputting a frequency correction value set on the basis of a symbol rate, a frequency corrector for giving a frequency offset to the digital signals on the basis of the frequency correction value to generate frequency-corrected signals, a timing recovering unit for performing timing recovery by extracting symbol timing for the frequency-corrected signals, a C/N detector for detecting C/N from a symbol obtained by the timing recovering unit, an optimum frequency correction value determining unit for treating a frequency correction value corresponding to the maximum value of the C/N as an optimum frequency correction value, a carrier recovering unit for performing carrier recovery by correcting finally a shift in the frequency of a signal which underwent a frequency correction with the optimum frequency correction value and timing recovery, and a synchronization detector for making an error correction on a symbol after carrier recovery and for detecting a unique word.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
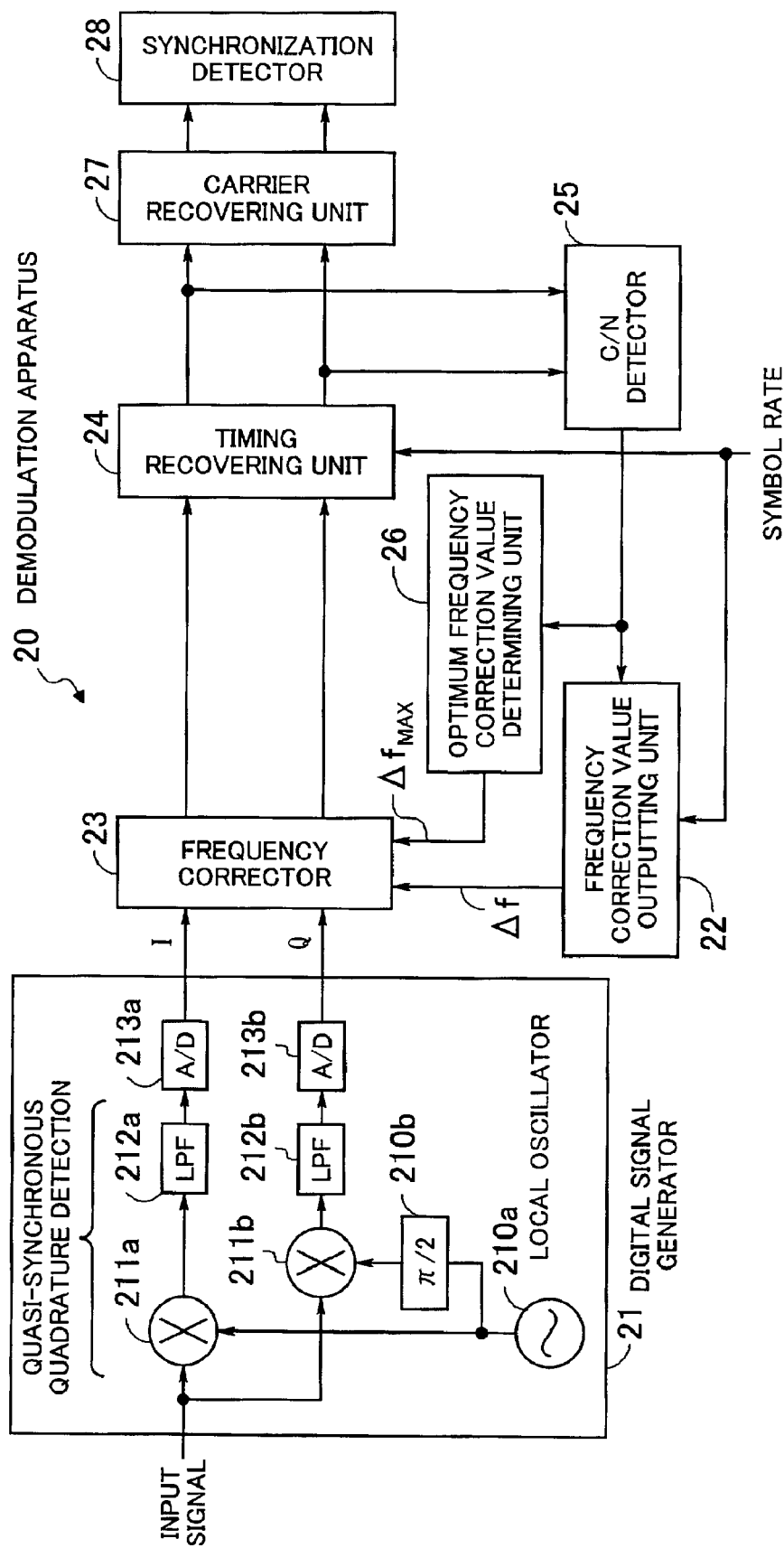
FIG. 1 is a view for describing the principles underlying a demodulation apparatus according to the present invention.

Embodiments of the present invention will now be described with reference to the drawings. FIG. 1 is a view for describing the principles underlying a demodulation apparatus according to the present invention. A demodulation apparatus 20 demodulates modulated signals. It is assumed that the demodulation apparatus 20 demodulates n-phase PSK modulated signals.

A digital signal generator 21 comprises a local oscillator 210a, a $\pi/2$ phase shifter 210b, multipliers 211a and 211b, low-pass filters (LPF) 212a and 212b, and analog-digital (A/D) converters 213a and 213b.

The local oscillator 210a generates a sine wave with a frequency and phase being the same as those of a carrier used for modulation on the sending side. The $\pi/2$ phase shifter 210b shifts by $\pi/2$ the phase of a signal sent from the local oscillator 210a. The multiplier 211a calculates the product of an input signal and a signal sent from the local oscillator 210a. The multiplier 211b calculates the product of the input signal and output from the $\pi/2$ phase shifter 210b.

The LPFs 212a and 212b cause the low-frequency components of signals output from the multipliers 211a and 211b to pass through them. The A/D converters 213a and 213b make A/D conversions on output from the LPFs 212a and 212b respectively to generate digital signals corresponding to the I and Q axes, being phase axes. The digital signal generator 21 performs quasi-synchronous quadrature detection of an n-phase PSK modulated signal in this way to output digitized I- and Q-axis channel signals.

A frequency correction value outputting unit 22 is a sequencer which outputs a frequency correction value $\Delta f$ ($0 \to \Delta A_1 \to -\Delta A_1 \to 2\Delta A_1 \to -2\Delta A_1 \to 3\Delta A_1 \to -3\Delta A_1 \to \ldots$) (Hz) set on the basis of a symbol rate. $\Delta A_1$ is a value which falls within the range of pull-in operation (operation to shift from a state in which there is a shift in frequency to a state in which there is no shift in frequency as a result of control) by a carrier recovering unit 27 described later. A symbol is a signal waveform which represents the information of "0" or "1." If continuous time of that information is T, then a symbol rate is given by 1/T.

A frequency corrector 23 gives a frequency offset to digital signals for the I and Q channels on the basis of frequency correction value $\Delta f$ to generate frequency-corrected signals. A timing recovering unit 24 performs timing recovery by extracting symbol timing for taking information out of a frequency-corrected signal on the basis of a symbol rate.

A carrier/noise (C/N) detector 25 detects C/N from a symbol obtained by the timing recovering unit 24. An optimum frequency correction value determining unit 26 monitors and sweeps C/N values and treats a frequency correction value corresponding to the maximum C/N value as optimum frequency correction value $\Delta f_{MAX}$.

A carrier recovering unit 27 performs carrier recovery by correcting finally a shift in the frequency of a signal which underwent a frequency correction with optimum frequency correction value $\Delta f_{MAX}$ and timing recovery. That is to say, the frequency corrector 23 makes a frequency correction on output from the digital signal generator 21 by the use of optimum frequency correction value $\Delta f_{MAX}$ to generate a frequency-corrected signal. The timing recovering unit 24 performs timing recovery for this frequency-corrected signal. At this stage, output from the timing recovering unit 24 is within the pull-in range of the carrier recovering unit 27, so the carrier recovering unit 27 performs a pull-in process to correct finally a shift in the frequency of a symbol signal.

A synchronization detector 28 makes an error correction on a symbol after carrier recovery and detects a unique word in a frame.

Figure 2:
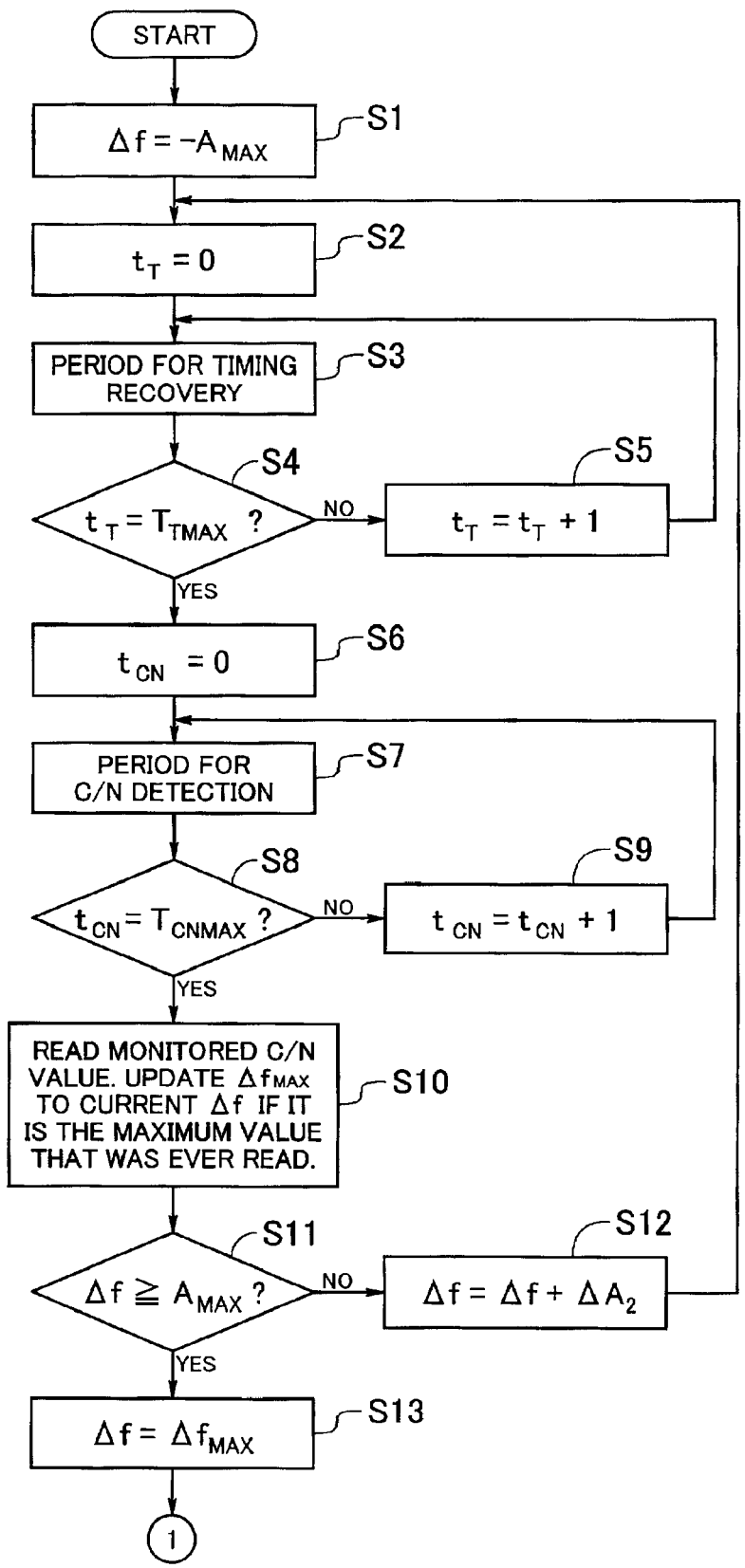
FIG. 2 is a flow chart showing the operation of the demodulation apparatus.
Figure 3:
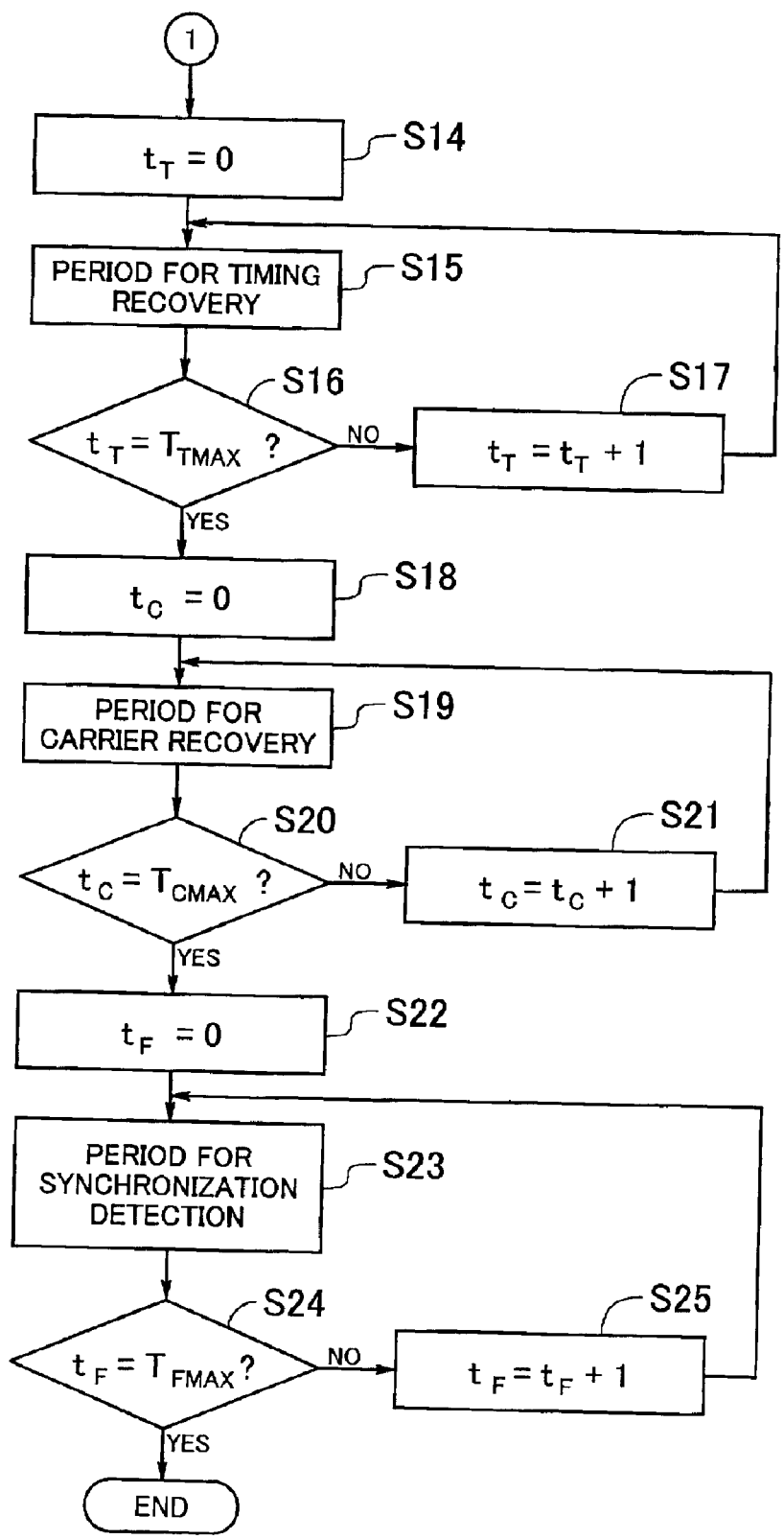
FIG. 3 is a flow chart showing the operation of the demodulation apparatus.

FIGS. 2 and 3 are flow charts showing the operation of the demodulation apparatus 20 (according to a first embodiment of the present invention).

[S1] The demodulation apparatus 20 sets frequency correction value $\Delta f$ for the frequency corrector 23 to lower limit value $-A_{MAX}$ of a pull-in range.

[S2] The demodulation apparatus 20 initializes a timer for ensuring lock time for the timing recovering unit 24.

[S3] The demodulation apparatus 20 performs timing recovery.

[S4] The demodulation apparatus 20 judges whether time timing recovery needs to lock has elapsed. If it has elapsed, then the demodulation apparatus 20 proceeds to step S6. If it has not elapsed, then the demodulation apparatus 20 proceeds to step S5.

[S5] The demodulation apparatus 20 counts up the timer.

[S6] The demodulation apparatus 20 initializes a timer for ensuring time to detect C/N for the C/N detector 25.

[S7] The demodulation apparatus 20 performs C/N detection.

[S8] The demodulation apparatus 20 judges whether time the C/N detector 25 needs to detect C/N has elapsed. If it has elapsed, then the demodulation apparatus 20 proceeds to step S10. If it has not elapsed, then the demodulation apparatus 20 proceeds to step S9.

[S9] The demodulation apparatus 20 counts up the timer.

[S10] The demodulation apparatus 20 reads the current monitored C/N value. If it is the maximum monitored C/N value that the demodulation apparatus 20 ever read, then the demodulation apparatus 20 updates $\Delta f_{MAX}$ to the current $\Delta f$ (frequency correction value for the frequency corrector 23). If it is not the maximum monitored C/N value that the demodulation apparatus 20 ever read, then the demodulation apparatus 20 does not update $\Delta f_{MAX}$.

[S11] The demodulation apparatus 20 judges whether frequency correction value $\Delta f$ for the frequency corrector 23 has reached upper limit value $A_{MAX}$ of the pull-in range. If it has reached upper limit value $A_{MAX}$ of the pull-in range, then the demodulation apparatus 20 proceeds to step S13. If it has not reached upper limit value $A_{MAX}$ of the pull-in range, then the demodulation apparatus 20 proceeds to step S12.

[S12] The demodulation apparatus 20 makes frequency correction value $\Delta f$ for the frequency corrector 23 greater.

[S13] The frequency corrector 23 updates frequency correction value $\Delta f$ to $\Delta f_{MAX}$.

[S14] The demodulation apparatus 20 initializes the timer for ensuring lock time for the timing recovering unit 24.

[S15] The demodulation apparatus 20 performs timing recovery.

[S16] The demodulation apparatus 20 judges whether time timing recovery needs to lock has elapsed. If it has elapsed, then the demodulation apparatus 20 proceeds to step S18. If it has not elapsed, then the demodulation apparatus 20 proceeds to step S17.

[S17] The demodulation apparatus 20 counts up the timer.

[S18] The demodulation apparatus 20 initializes a timer for ensuring lock time for the carrier recovering unit 27.

[S19] The demodulation apparatus 20 performs carrier recovery.

[S20] The demodulation apparatus 20 judges whether time carrier recovery needs to lock has elapsed. If it has elapsed, then the demodulation apparatus 20 proceeds to step S22. If it has not elapsed, then the demodulation apparatus 20 proceeds to step S21.

[S21] The demodulation apparatus 20 counts up the timer.

[S22] The demodulation apparatus 20 initializes a timer for ensuring lock time for frame detection.

[S23] The demodulation apparatus 20 performs frame detection.

[S24] The demodulation apparatus 20 judges whether time frame detection needs to lock has elapsed. If it has elapsed, then the demodulation apparatus 20 terminates the procedure. If it has not elapsed, then the demodulation apparatus 20 proceeds to step S25.

[S25] The demodulation apparatus 20 counts up the timer.

Figure 4:
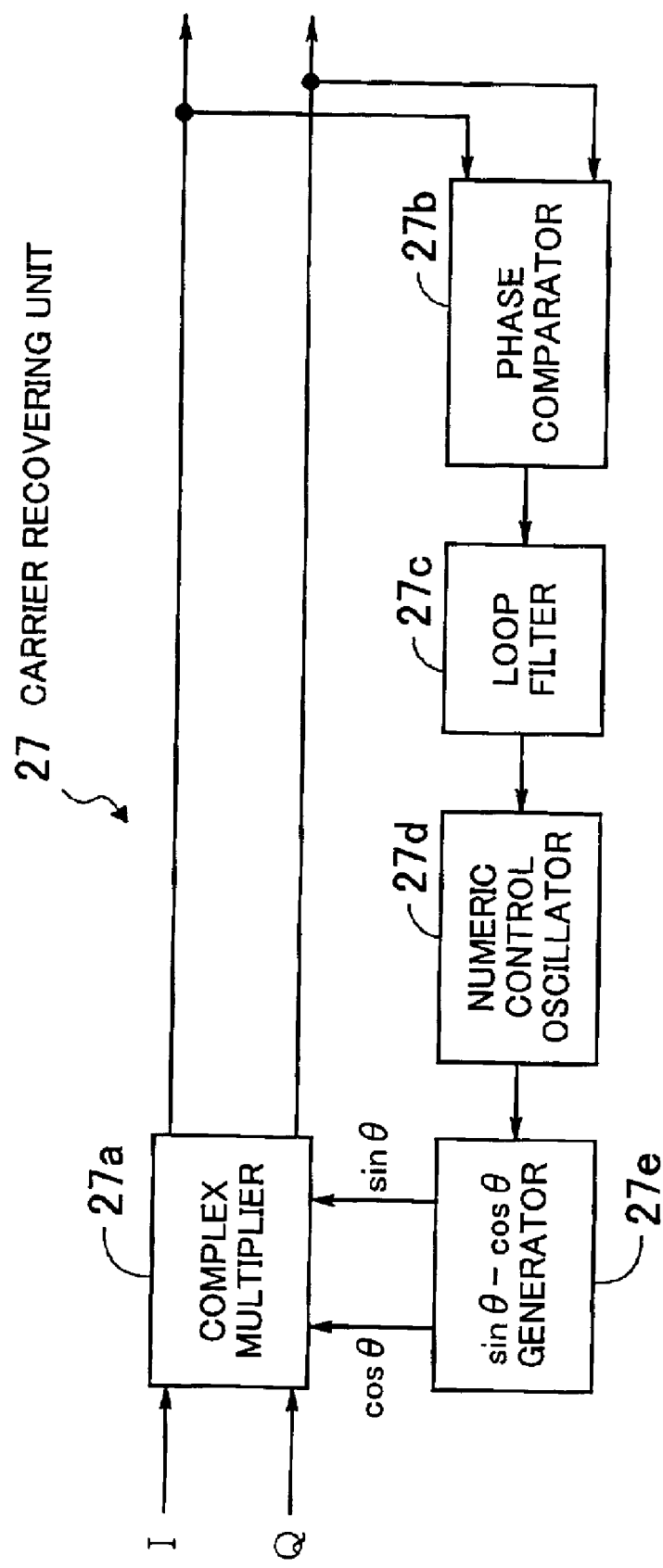
FIG. 4 is a view showing the configuration of a carrier recovering unit.

The configuration of the carrier recovering unit 27 will now be described. FIG. 4 is a view showing the configuration of the carrier recovering unit 27. A complex multiplier 27a rotates a symbol by $\theta$ (rad) on the basis of output from sin $\theta$-cos $\theta$ generator 27e. A phase comparator 27b calculates difference in phase between output from the complex multiplier 27a.

A loop filter 27c smoothes output from the phase comparator 27b. A numeric control oscillator 27d oscillates according to a value output from the loop filter 27c. The sin θ-cos θ generator 27e generates sin θ and cos θ values according to a value output from the numeric control oscillator 27d.

Now, the distribution relationship between a shift in the frequency of a carrier (hereinafter referred to as a "carrier shift") and a symbol will be described. FIGS. 5 through 8 are views showing a constellation of output from the timing recovering unit 24 depending on a carrier shift. In FIGS. 5 through 8, there are a greater number of symbol points in an area being of a deeper color.

Figure 5:
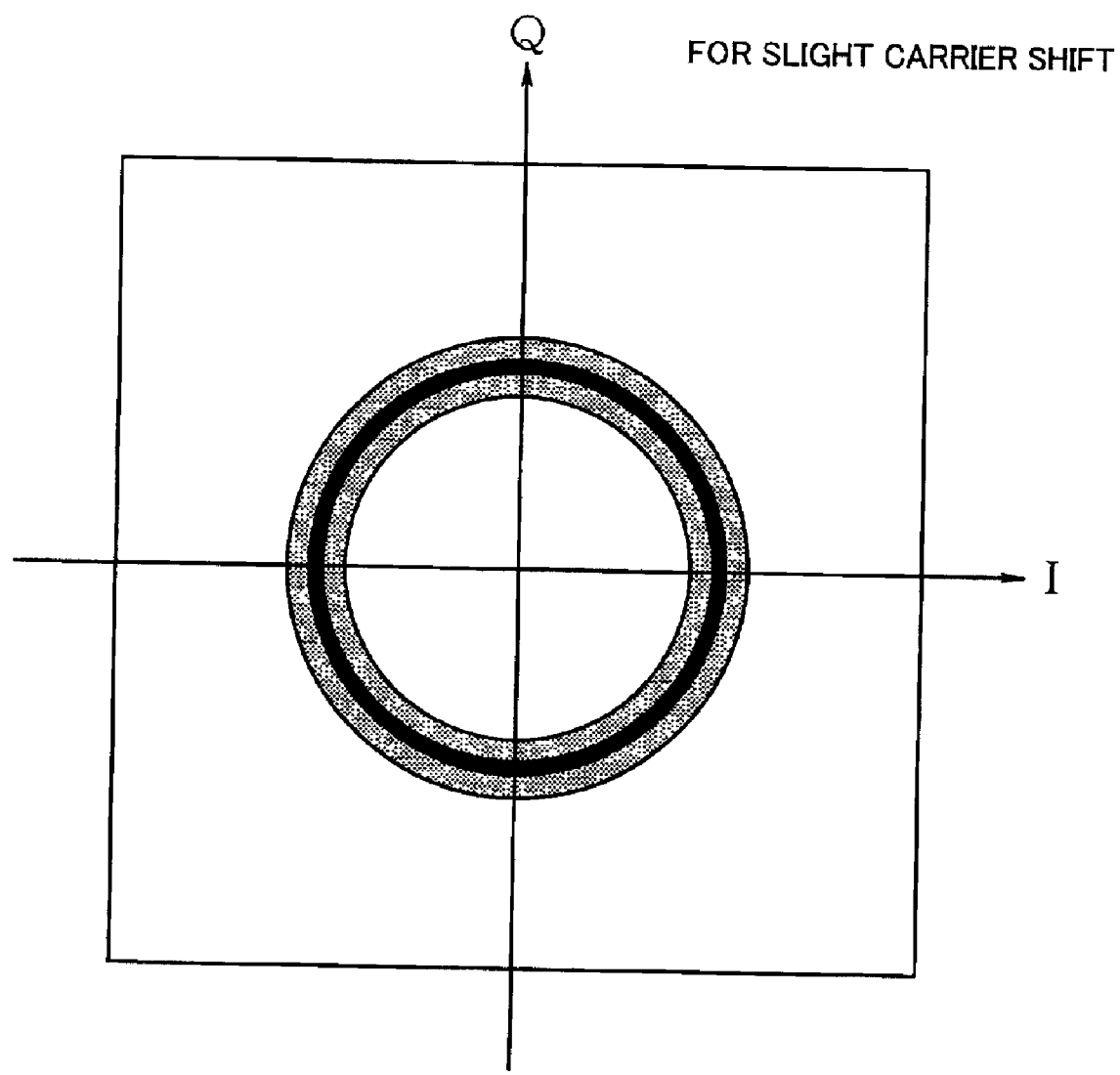
FIG. 5 is a view showing a constellation of output from a timing recovering unit depending on a carrier shift.
Figure 6:
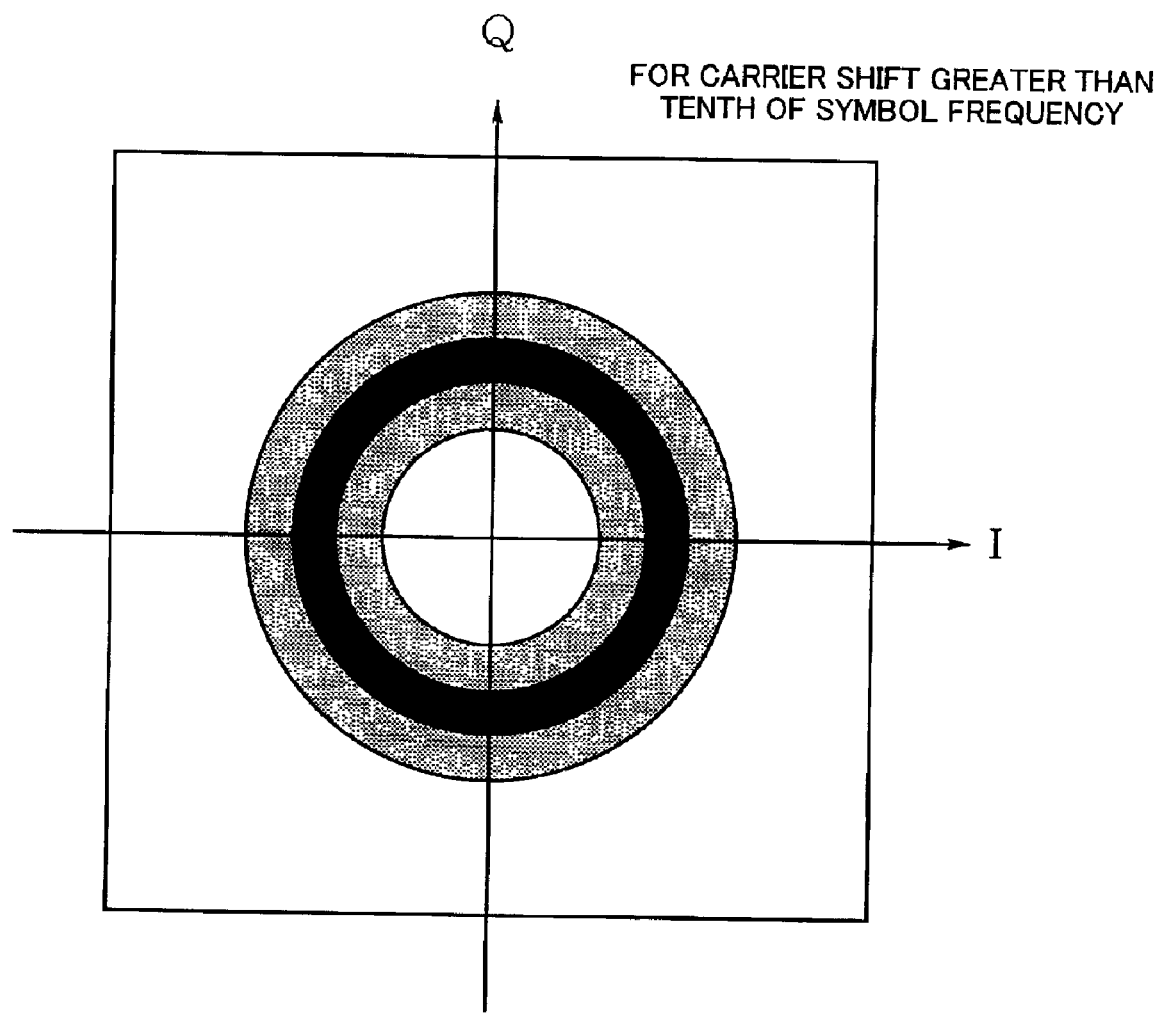
FIG. 6 is a view showing a constellation of output from the timing recovering unit depending on a carrier shift.
Figure 7:
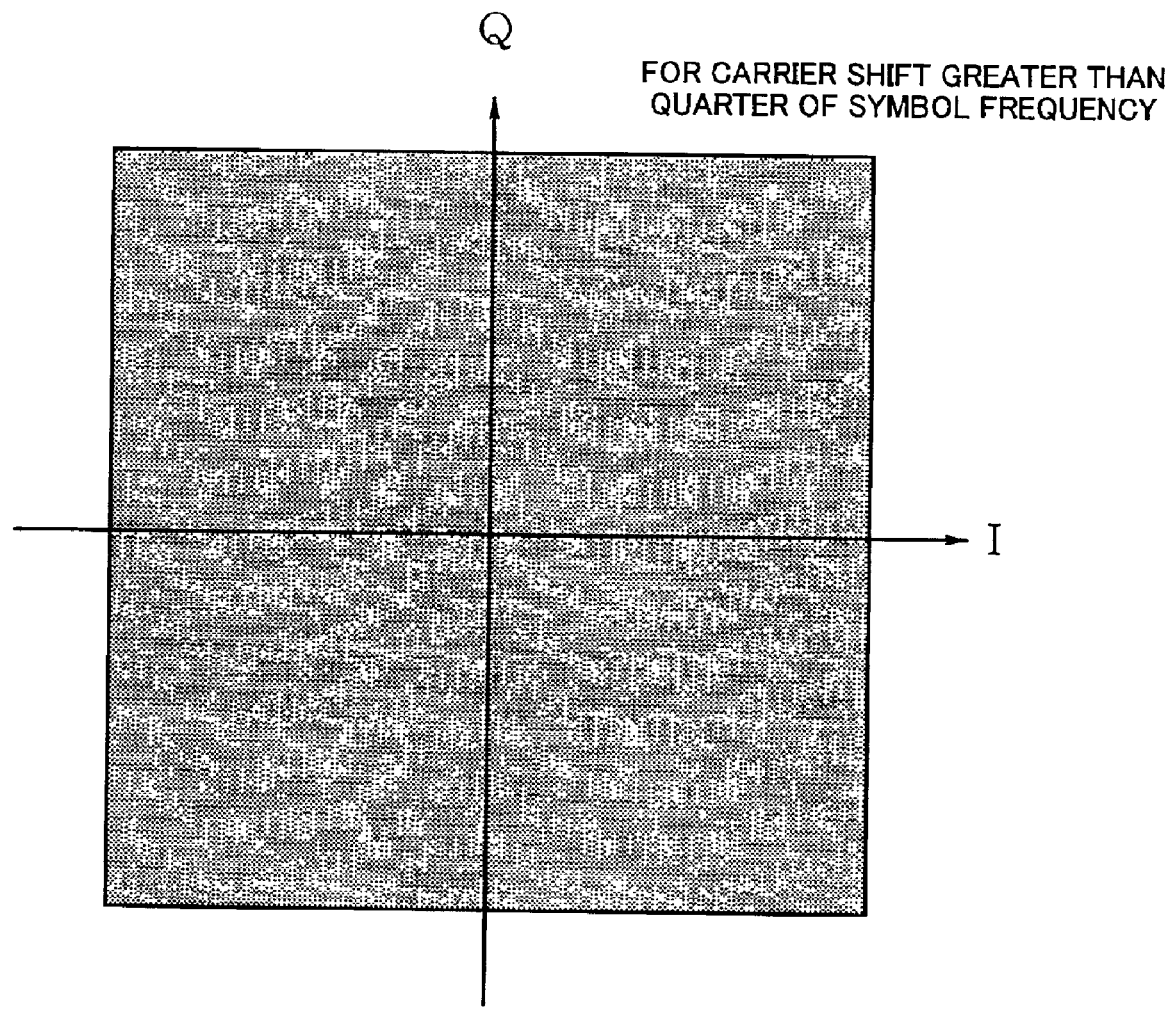
FIG. 7 is a view showing a constellation of output from the timing recovering unit depending on a carrier shift.
Figure 8:
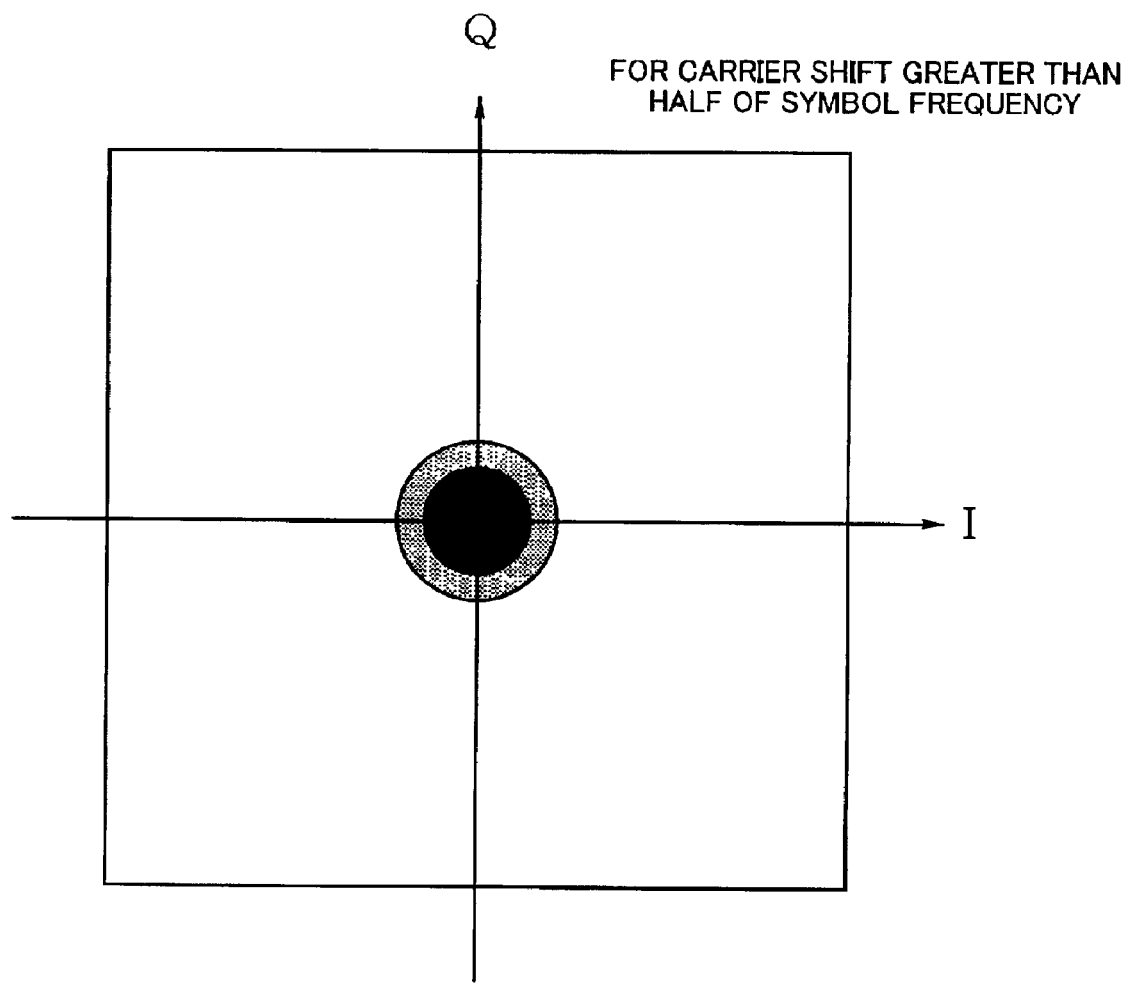
FIG. 8 is a view showing a constellation of output from the timing recovering unit depending on a carrier shift.

When a carrier shift is slight, most of symbol points are on a circle (FIG. 5). A greater carrier shift will result in greater dispersion of symbol points from on a circle (FIG. 6). When a carrier shift exceeds about a quarter of a symbol frequency, symbol points are not on a circle (FIG. 7). When a carrier shift exceeds half of a symbol frequency, symbol points will center in the vicinity of the origin because there is no base band component in output by quasi-synchronous quadrature detection (FIG. 8).

Figure 9:
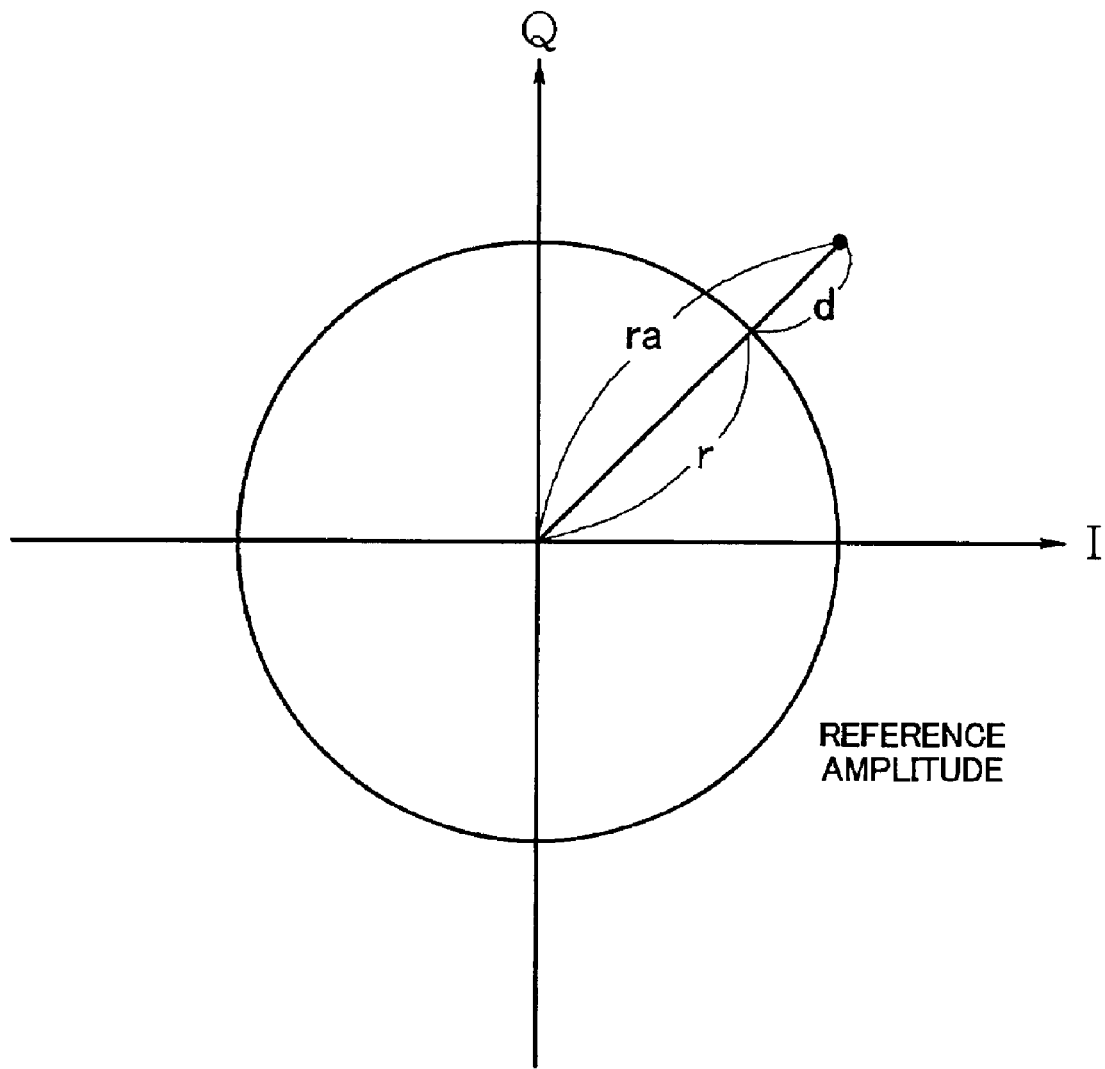
FIG. 9 is a view showing the relationship on a constellation between a carrier shift and C/N.

FIG. 9 is a view showing the relationship on a constellation between a carrier shift and C/N. On the constellation in FIG. 9, it is assumed that a circle with a radius of "r" is reference amplitude for a symbol frequency and that a symbol with the amplitude of radius "ra" is output from the timing recovering unit 24.

In this case, a shift in amplitude caused by noise is given by the absolute value of the difference between the reference amplitude and the symbol amplitude, that is to say, by d (=|r−ra|). The absolute values of the difference between the reference amplitude and symbol amplitude for a certain number of symbols are calculated and summed. The sum of these values corresponds to C/N which represents the ratio of a carrier to noise.

To be concrete, a great sum means that noise has a strong influence, resulting in a great carrier shift and a small C/N value. On the other hand, a small sum means that noise does not have a strong influence, resulting in a small carrier shift and a great C/N value.

Figure 10:
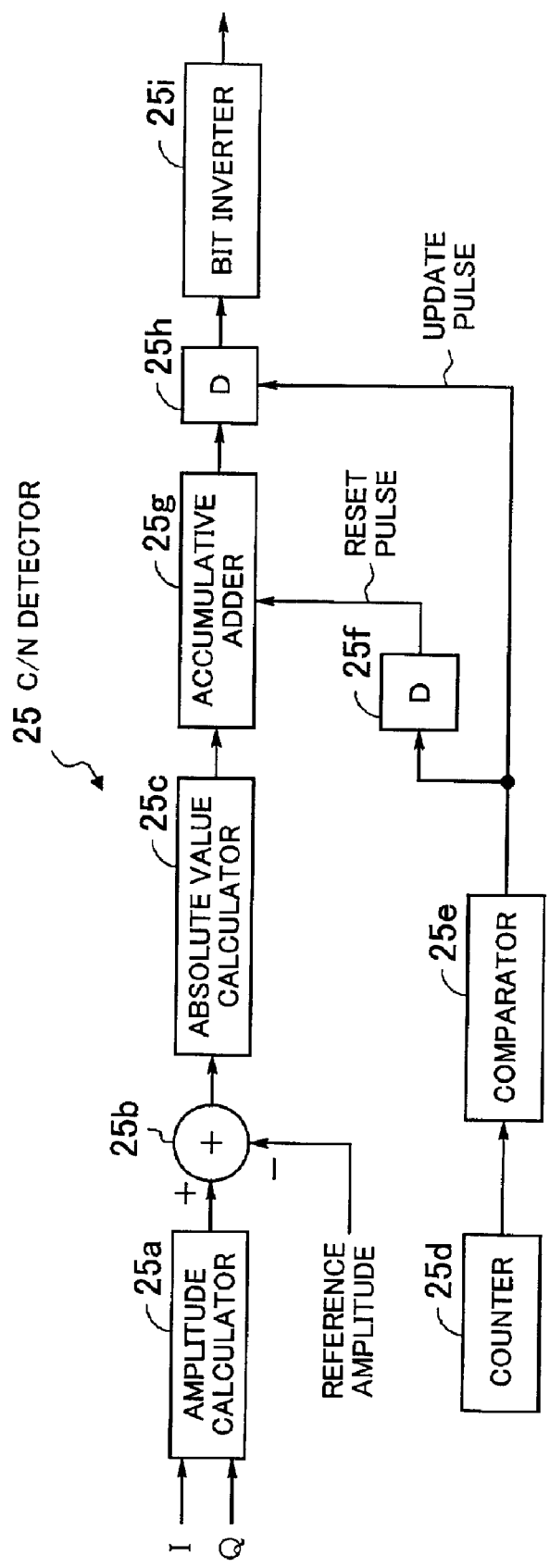
FIG. 10 is a view showing the configuration of a C/N detector.

FIG. 10 is a view showing the configuration of the C/N detector 25. An amplitude calculator 25a calculates symbol amplitude given by $(I^2+Q^2)^{0.5}$ from I and Q signals output from the timing recovering unit 24. A differential calculator 25b calculates the difference between reference amplitude and symbol amplitude. An absolute value calculator 25c finds the absolute value of the difference.

A counter 25d counts one every symbol cycle and returns to zero when the count exceeds, for example, 50000. A comparator 25e checks whether the count is 50000. If the count is 50000, the comparator 25e outputs "H" (update pulse). If the count is not 50000, the comparator 25e outputs "L" (reset pulse).

A latch 25f delays an input signal by one symbol and resets an accumulative adder 25g. The accumulative adder 25g adds input values one by one and is set to zero when a reset pulse is input.

A latch 25h holds a value when an update pulse turns to "H." A bit inverter 25i inverts input bits to output C/N information.

In the above circuit structure, the absolute values of the difference between reference amplitude and symbol amplitude for 50,000 symbols are summed and the sum of these values is updated every 50,000 symbols. Furthermore, as has been described with reference to FIGS. 4 through 8, a greater carrier shift will lead to greater dispersion in the amplitude direction, resulting in a greater value on the accumulative adder 25g. On the other hand, a smaller carrier shift will lead to smaller dispersion in the amplitude direction, resulting in a smaller value on the accumulative adder 25g.

Therefore, the bit inverter 25i is located at the output stage of the accumulative adder 25g so that a great carrier shift will bring a small C/N value, being a value output from the bit inverter 25i, and that a small carrier shift will bring a great C/N value, being a value output from the bit inverter 25i.

Figure 11:
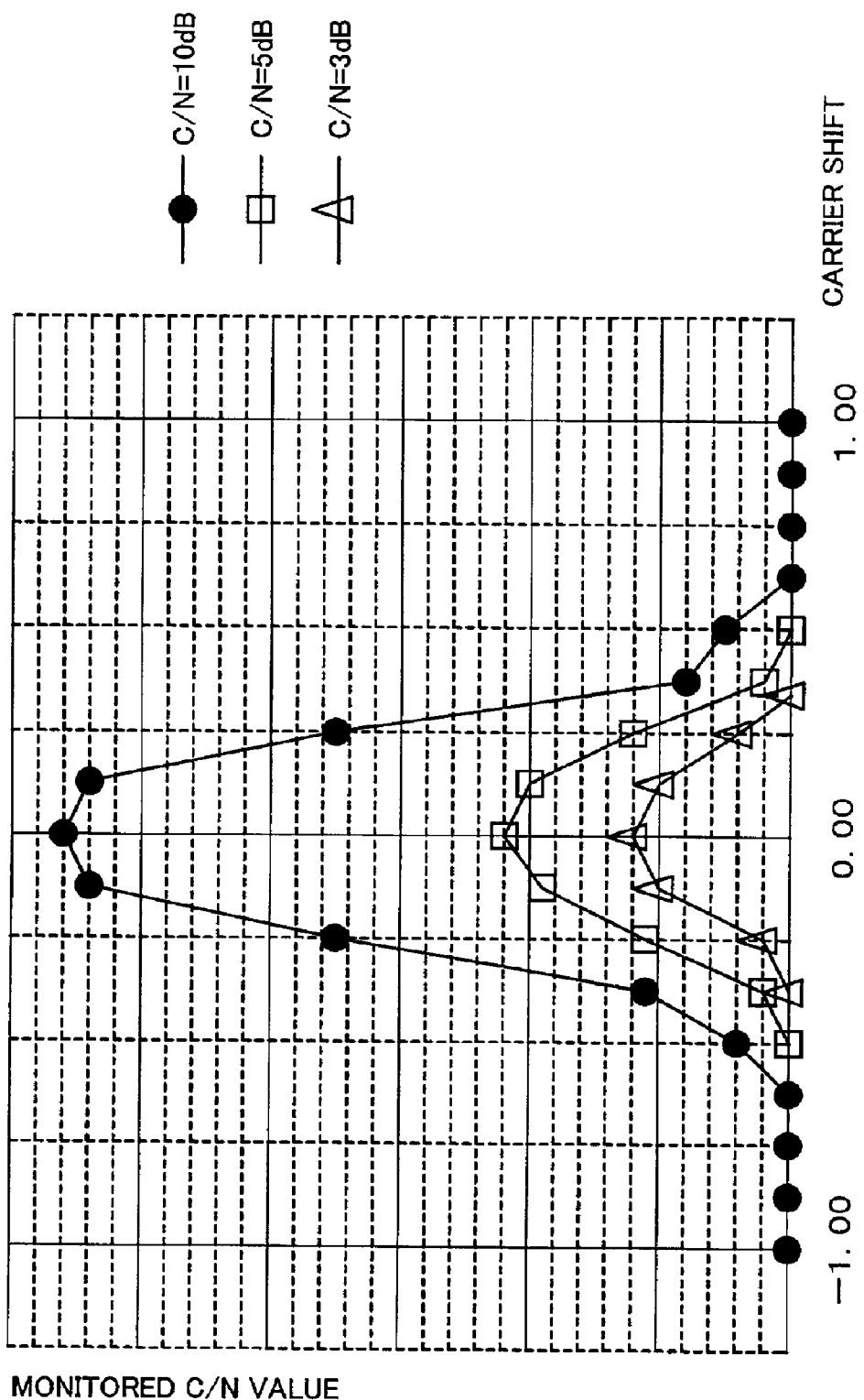
FIG. 11 is a view showing the simulation results of the relationship between a carrier shift and output from a C/N detecting circuit.

FIG. 11 is a view showing the simulation results of the relationship between a carrier shift and output from a C/N detecting circuit. These simulation results are obtained by inputting signals obtained when timing recovery is performed on QPSK-modulated signals with a symbol frequency of 1 MHz into the circuit shown in FIG. 10. A vertical axis in FIG. 11 indicates monitored C/N values (dB) and a horizontal axis indicates carrier shifts (MHz).

FIG. 11 shows that a point where a carrier shift is zero gives the maximum C/N value. In addition, FIG. 11 shows that the width of a convex portion of the output corresponding to small C/N values is about half of the symbol frequency. Therefore, when a carrier shift is detected with this monitored C/N value, a frequency skip with a width narrower than or equal to half of the symbol frequency must be used.

Figure 12:
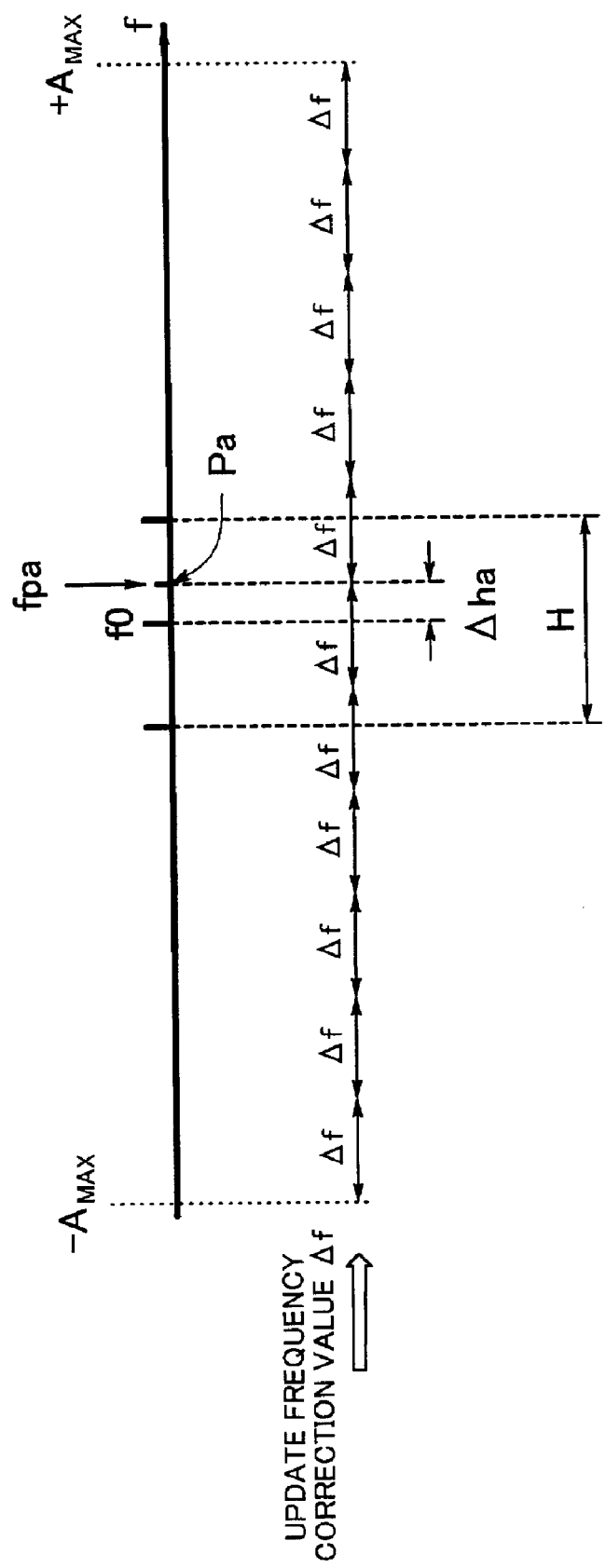
FIG. 12 is a view showing the image of operation in a first embodiment.

The image of operation in the first embodiment will now be described. FIG. 12 is a view showing the image of operation in the first embodiment. A horizontal axis in FIG. 12 indicates frequencies. Frequency f0 is the one which the carrier recovering unit 27 should realize finally. "H" in FIG. 12 is a pull-in range.

In the first embodiment, frequency correction value Δf (smaller than H) will be updated in order. In a state shown in FIG. 12, point Pa gives the maximum C/N value and frequency fpa at point Pa is the optimum frequency correction value.

Shift Aha between optimum frequency correction value fpa and frequency f0 is within pull-in range H of the carrier recovering unit 27, so the carrier recovering unit 27 can pull in. The carrier recovering unit 27 therefore corrects the carrier shift finally to perform carrier recovery.

With a conventional technique, it takes a long time to update frequency correction value Δf. That is to say, the process of timing recovery→ carrier recovery→ detection of synchronization is performed to check that synchronization has not been detected, before a frequency correction value is updated.

Therefore, it takes the total of timing recovery lock time, carrier recovery lock time, and unique word detection time ($T_{TMAX}+T_{CMAX}+T_{FMAX}$) to update a frequency correction value once. In other words, it takes a long time to correct a frequency so that it will fall within a pull-in range.

Meanwhile, in the first embodiment of the present invention, the maximum C/N value is found first by C/N detection to detect frequency fpa which the carrier recovering unit 27 can pull in. Therefore, it only takes timing recovery lock time and C/N detection time to update a frequency correction value once. As a result, the number of times a frequency correction value is updated is the same as before, but update time is shorter (a skip cycle is shorter). This enables to demodulate in a shorter time than before.

As stated above, in the present invention, C/N for a symbol frequency on which a frequency correction by the use of each frequency correction value Δf and timing recovery have been made is detected. Then the detected C/N is swept to detect the maximum value. If a frequency correction value corresponding to the maximum C/N value is represented by optimum frequency correction value $\Delta f_{MAX}$, a symbol frequency on which a frequency correction by the use of optimum frequency correction value $\Delta f_{MAX}$ and timing recovery have been made can be judged to be a signal with the smallest carrier shift. A slight carrier shift which still exists in that signal will be within the pull-in range of the carrier recovering unit 27, so the carrier recovering unit 27 can correct it.

The optimum frequency correction value determining unit 26 for monitoring and sweeping C/N values and for treating a frequency correction value corresponding to the maximum C/N value as the optimum frequency correction value, shown in FIG. 1, has been described as one component. However, the function of the optimum frequency correction value determining unit 26 may be included in at least one of the frequency correction value outputting unit 22 and the C/N detector 25.

Figure 13:
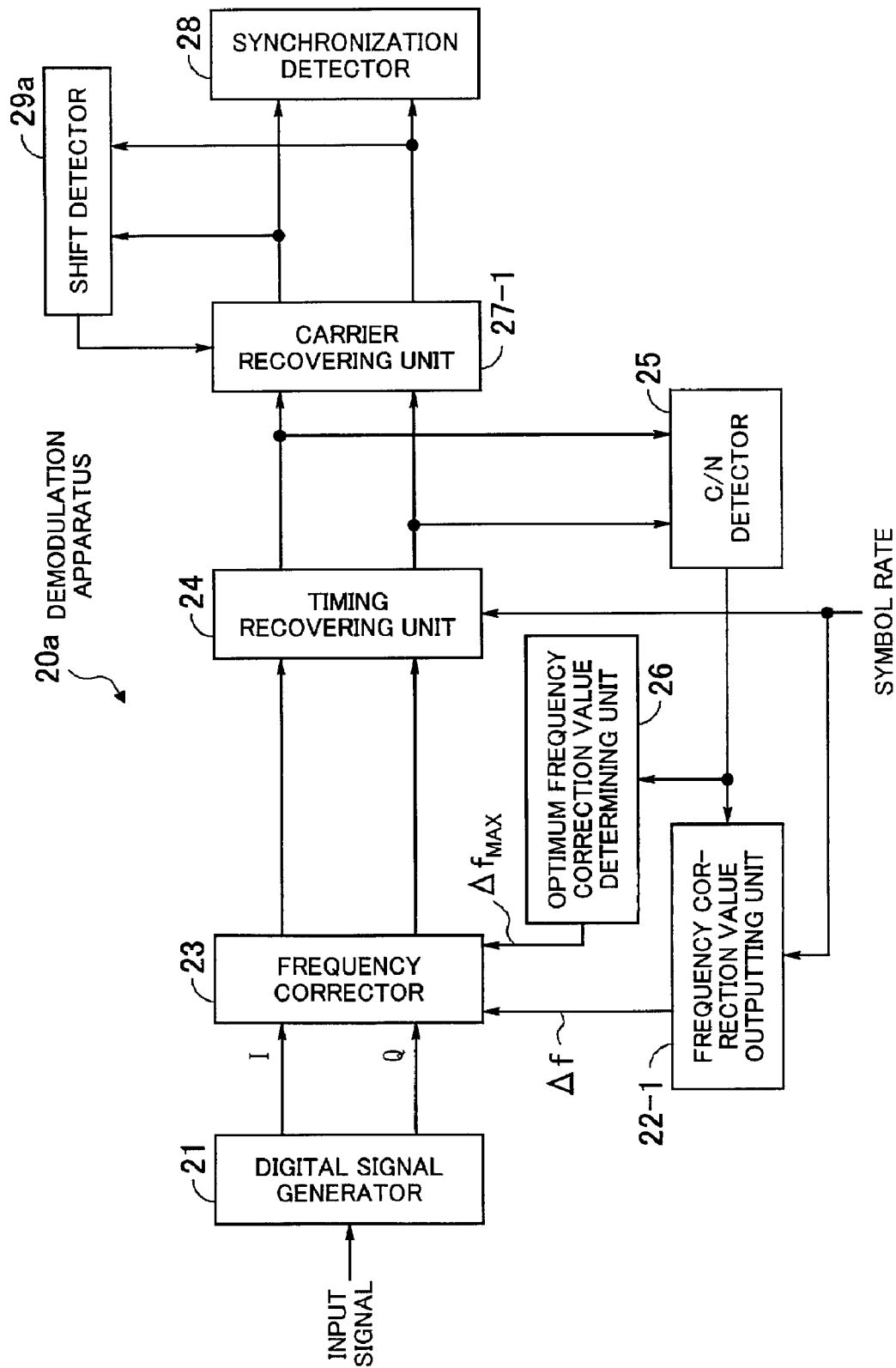
FIG. 13 is a view showing the configuration of a second embodiment.

Now, a demodulation apparatus according to a second embodiment of the present invention will be described. FIG. 13 is a view showing the configuration of the second embodiment. Components which are the same as those in FIG. 1 are marked with the same symbols and descriptions of them will be omitted.

In a demodulation apparatus 20a according to the second embodiment, the amount of a frequency skip for frequency correction values output from a frequency correction value outputting unit 22-1 is larger than that of a frequency skip for frequency correction values output in the first embodiment. That is to say, a frequency correction value varies by the amount of a frequency skip being greater than the pull-in range of the carrier recovering unit 27 used in the first embodiment.

A shift detector 29a detects a frequency shift from a signal on which a frequency correction by the use of an optimum frequency correction value determined on the basis of a frequency skip being greater than the pull-in range and timing recovery have been made.

A carrier recovering unit 27-1 receives the amount of a shift detected by the shift detector 29a, extends its pull-in range, and corrects the shift in carrier frequency to perform carrier recovery.

Figure 14:
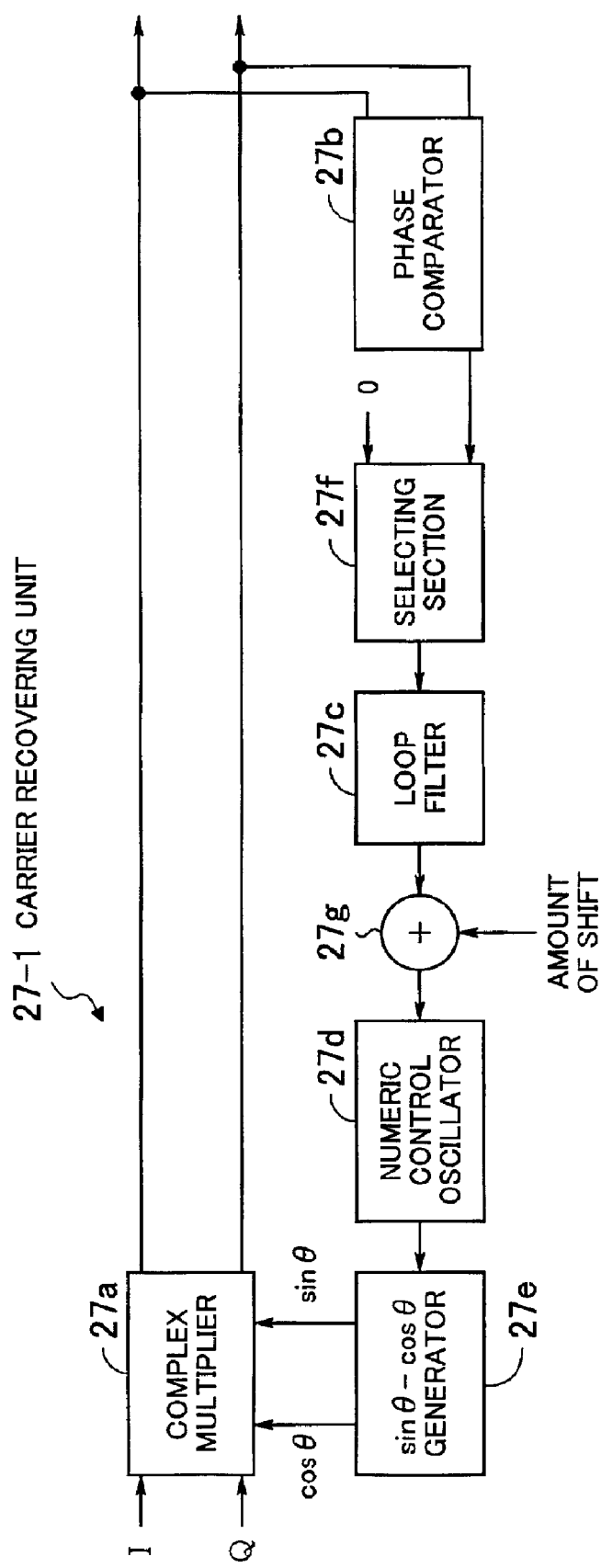
FIG. 14 is a view showing the configuration of a carrier recovering unit in the second embodiment.

FIG. 14 is a view showing the configuration of the carrier recovering unit 27-1 in the second embodiment. Components which are the same as those in FIG. 4 are marked with the same symbols and descriptions of them will be omitted.

While the shift detector 29a is detecting the amount of a shift, a selecting section 27f selects zero and sends the output of zero to a loop filter 27c to invalidate feedback control (stops the operation of the carrier recovering unit 27-1). When the shift detector 29a finishes detecting the amount of a shift, the selecting section 27f selects output from a phase comparator 27b to validate normal feedback control.

An adder 27g adds the amount of a shift output from the shift detector 29a and the value of the loop filter 27c together and sends their sum (which indicates a pull-in range being wider than that in the first embodiment) to a numeric control oscillator 27d.

Figure 15:
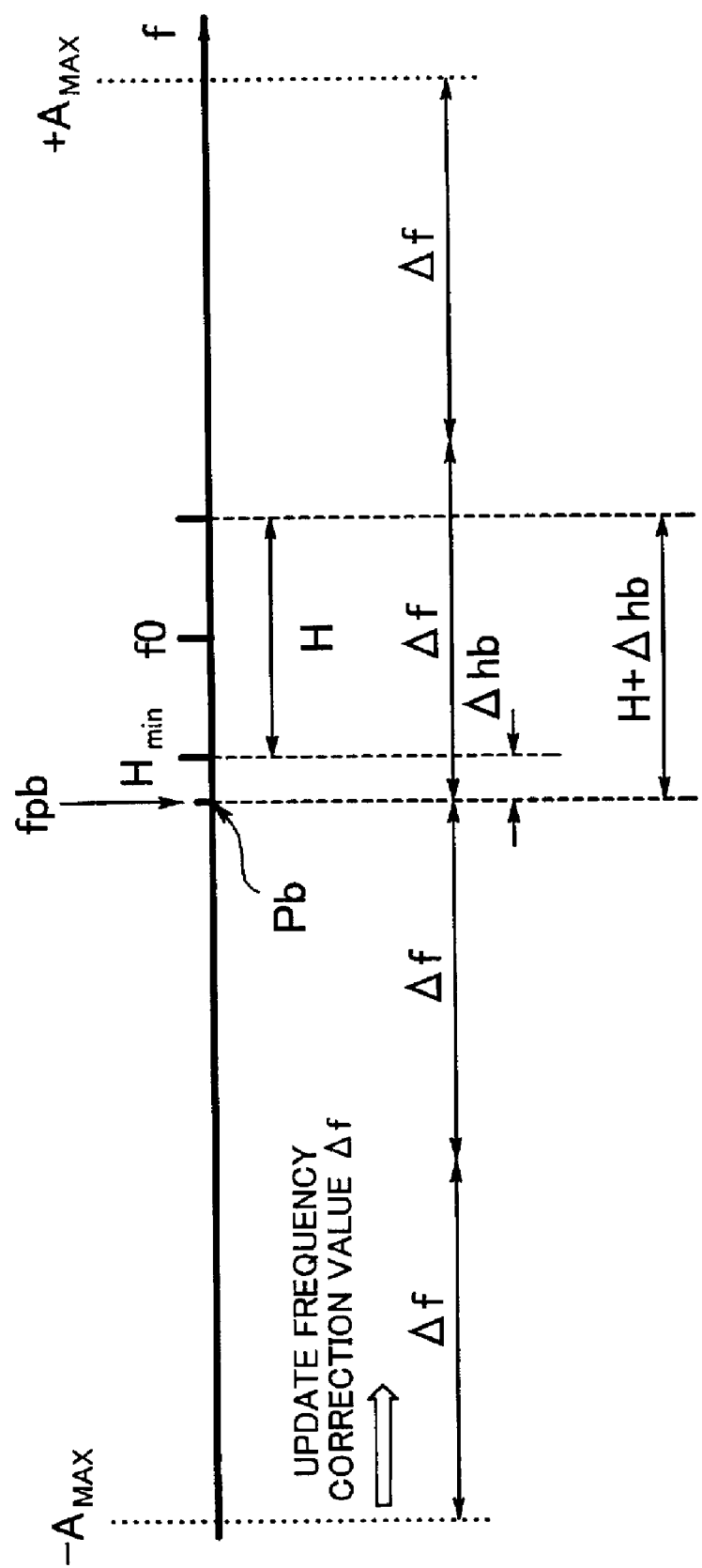
FIG. 15 is a view showing the image of operation in the second embodiment.

Operation will now be described. FIG. 15 is a view showing the image of operation in the second embodiment. A horizontal axis in FIG. 15 indicates frequencies. Frequency f0 is the one which the carrier recovering unit 27-1 should realize finally. "H" in FIG. 15 is a first pull-in range.

In the second embodiment, frequency correction value $\Delta f$ (greater than H) will be updated in order. In a state shown in FIG. 15, point Pb gives the maximum C/N value and frequency fpb at point Pb is the optimum frequency correction value.

The shift detector 29a detects shift $\Delta hb$ between the optimum frequency correction value and minimum value $H_{min}$ in pull-in range H and provides it to the carrier recovering unit 27-1. As a result, the pull-in range of the carrier recovering unit 27-1 extends from H to (H+$\Delta hb$). The carrier recovering unit 27-1 therefore performs pull-in operation in pull-in range (H+$\Delta hb$) to correct a shift in frequency finally to frequency f0.

As described above, in the second embodiment, a frequency correction is made with a frequency correction value being greater than the pull-in range (H) of the carrier recovering unit 27 in the first embodiment. Then shift $\Delta hb$ between an optimum frequency correction value determined and minimum value $H_{min}$ in pull-in range H is detected. And then the pull-in range is extended from H to (H+$\Delta hb$) and the carrier recovering unit 27-1 with pull-in range (H+$\Delta hb$) performs pull-in operation to perform carrier recovery.

As stated above, in the second embodiment, a frequency correction value is updated by a value being greater than the one used in the first embodiment. This will reduce the number of times a frequency correction value is updated, and enable to demodulate in a shorter time.

Figure 16:
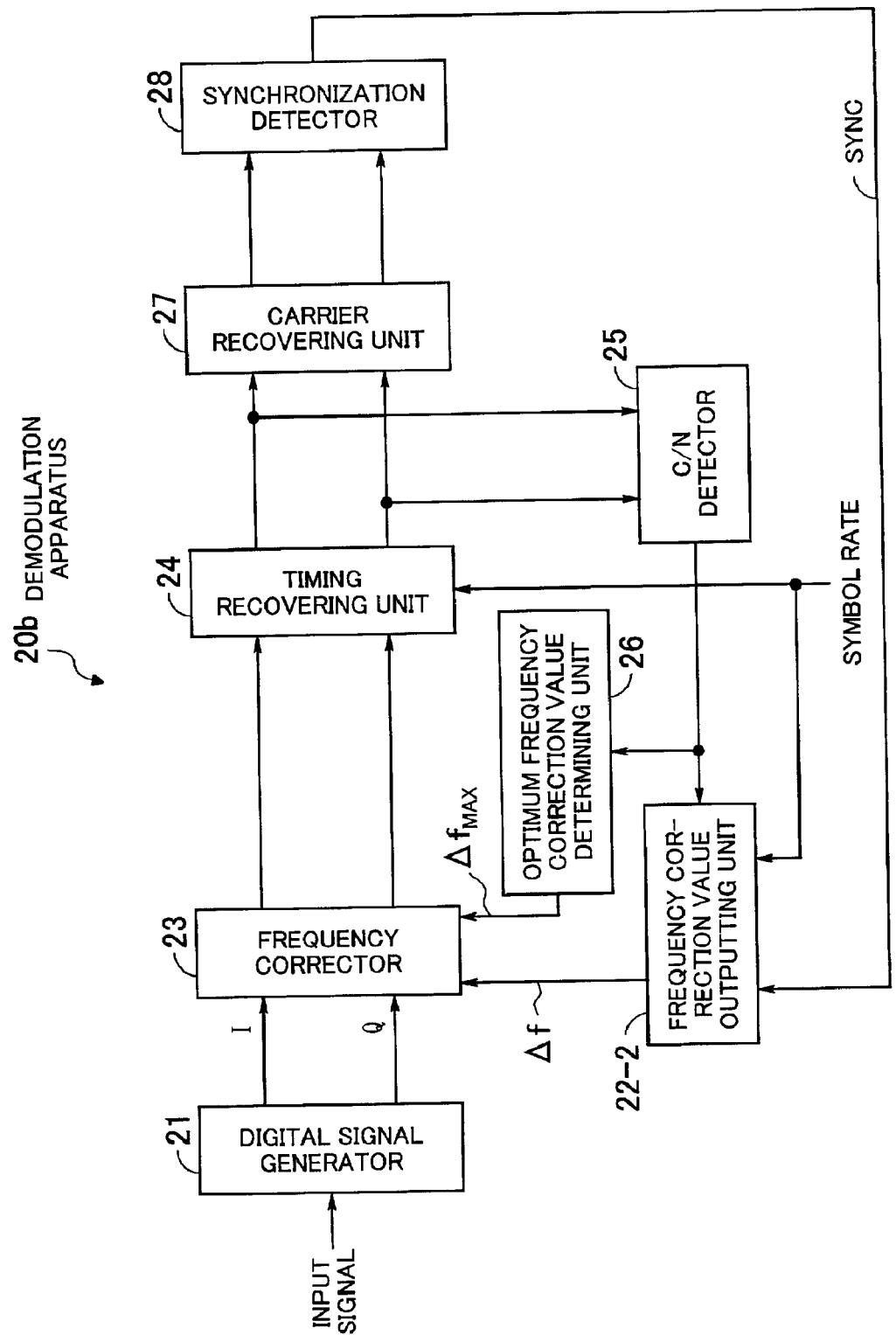
FIG. 16 is a view showing the configuration of a third embodiment.

Now, a demodulation apparatus according to a third embodiment of the present invention will be described. FIG. 16 is a view showing the configuration of the third embodiment. Components which are the same as those in FIG. 1 are marked with the same symbols and descriptions of them will be omitted.

A frequency correction value outputting unit 22-2 updates a frequency correction value by a value being greater than the pull-in range of a carrier recovering unit 27 until an optimum frequency correction value is determined. After an optimum frequency correction value is determined, the frequency correction value outputting unit 22-2 updates a frequency correction value by a value, which is smaller than the pull-in range, on the basis of a synchronization detection signal (SYNC signal).

Figure 17:
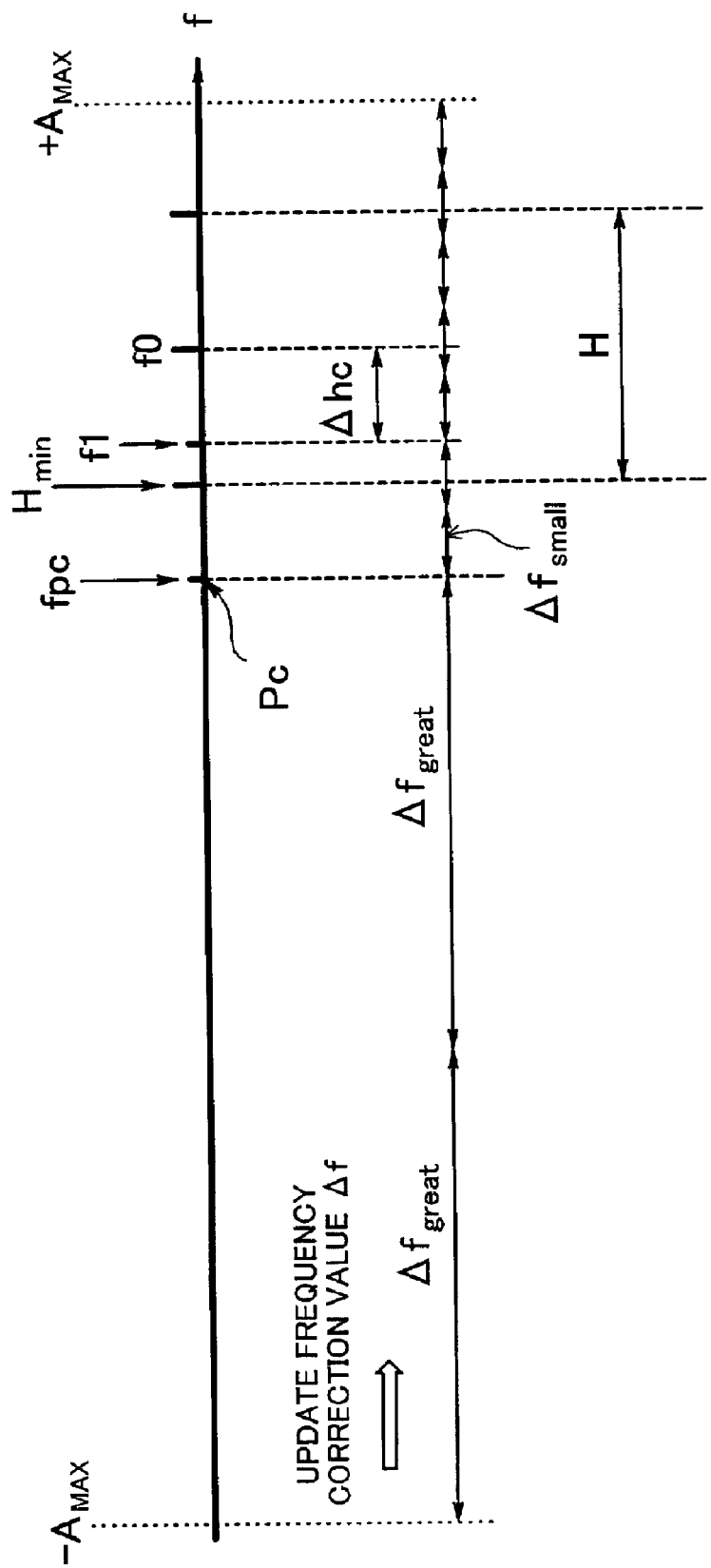
FIG. 17 is a view showing the image of operation in the third embodiment.

FIG. 17 is a view showing the image of operation in the third embodiment. A horizontal axis in FIG. 17 indicates frequencies. Frequency f0 is the one which the carrier recovering unit 27 should realize finally. "H" in FIG. 17 is a pull-in range.

In the third embodiment, first, frequency correction value $\Delta f_{great}$ being greater than pull-in range H is updated in order. In a state shown in FIG. 17, point Pc gives the maximum C/N value and frequency fpc at point Pc is the optimum frequency correction value.

At this stage, however, optimum frequency correction value fpc is not yet within pull-in range H, so the carrier recovering unit 27 cannot pull in. In the third embodiment of the present invention, therefore, after optimum frequency correction value fpc is determined, a frequency correction value is updated from point Pc in order by frequency correction value $\Delta f_{small}$ being smaller than pull-in range H.

A frequency correction value is updated by frequency correction value $\Delta f_{small}$ until it falls within pull-in range H. Frequency f1 which first falls within pull-in range H is found. Shift $\Delta hc$ between frequency f1 and frequency f0 is within pull-in range H of the carrier recovering unit 27. Therefore, the carrier recovering unit 27 can pull in and corrects a shift in frequency finally to perform carrier recovery.

Until the maximum C/N value is detected and the optimum frequency correction value is found, the same operation control that is performed in the second embodiment will apply. The frequency correction value outputting unit 22-2 monitors the state of a SYNC signal sent from a synchronization detector 28. If a SYNC signal is "L," the frequency correction value outputting unit 22-2 judges that synchronization has not yet been realized even by the use of the optimum frequency correction value. Then the frequency correction value outputting unit 22-2 updates a frequency correction value being smaller than pull-in range H until a SYNC signal turns to "H."

As described above, in the third embodiment, frequency corrections are made by the use of a frequency correction value being greater than pull-in range H to determine an optimum frequency correction value. This is the same with the second embodiment. If even the optimum frequency correction value does not enable pull-in, a frequency correction value being smaller than pull-in range H is updated on the basis of the state of a SYNC signal sent from the synchronization detector 28 in order to perform carrier recovery. As stated above, a frequency correction value is updated by making it smaller by stages, so demodulation can be performed in a shorter time than before.

Now, switching control for C/N detection will be described. Efficient pull-in control for carrier recovery by detecting C/N from a symbol depending on a carrier shift has been described.

Meanwhile, a demodulation apparatus according to the present invention is applicable to a satellite broadcast receiver etc. With a satellite broadcast receiver, the direction of an antenna for receiving radio waves is adjusted according to a C/N value (for example, a user looks at a monitored value on a television screen and adjusts the direction of an antenna). C/N needed in such a case does not depend on a carrier shift. Therefore, it is necessary to control switching between C/N at the time of demodulation control which depends on a carrier shift and C/N which does not depend on a carrier shift.

Figure 18:
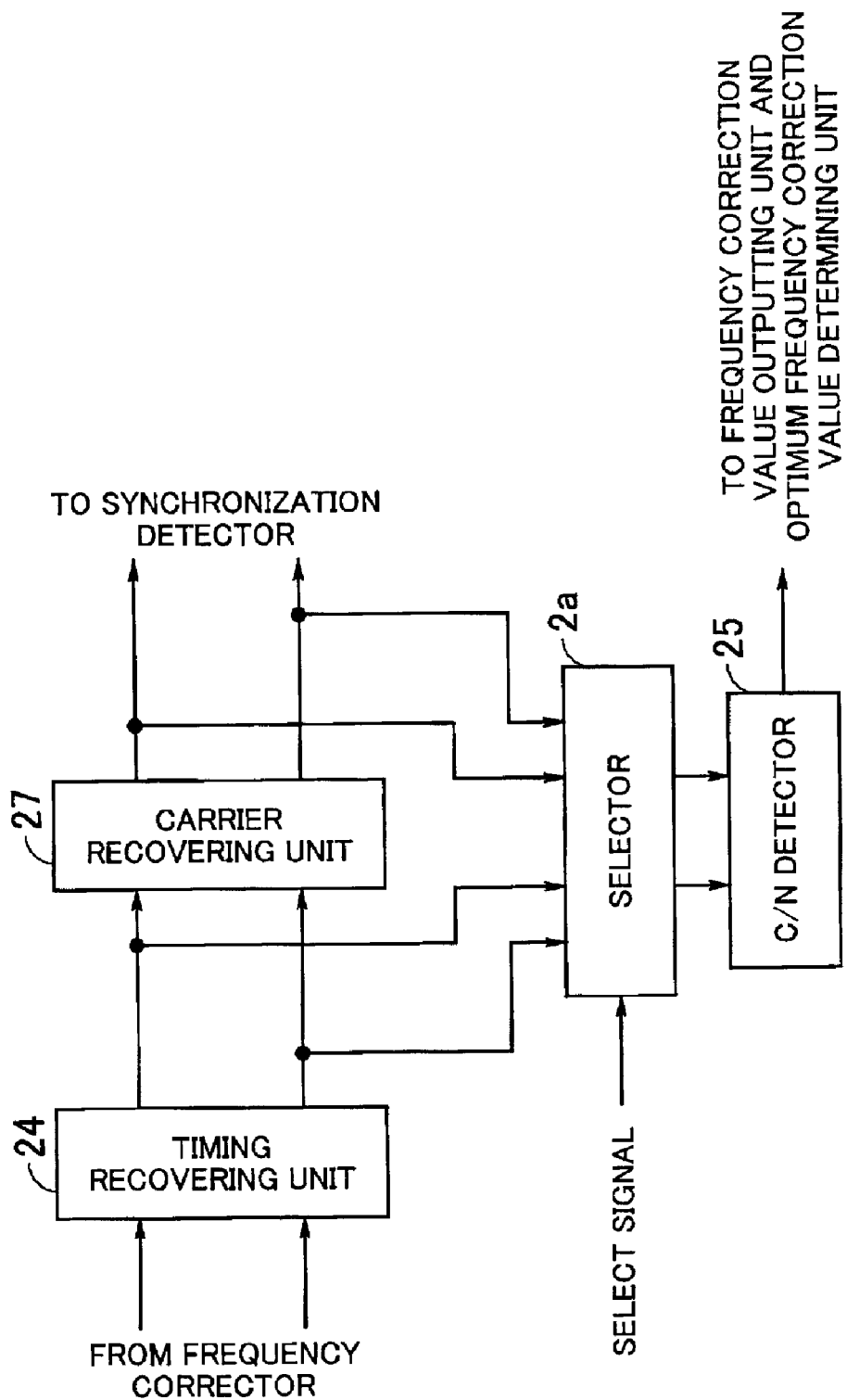
FIG. 18 shows an example of the configuration of control of C/N detection switching.

FIG. 18 shows an example of the configuration of control of C/N detection switching. Only blocks around C/N detector 25 are shown. Components which are the same as those in FIG. 1 are marked with the same symbols and descriptions of them will be omitted.

A selector 2a selects, before carrier recovery, a signal output from a timing recovering unit 24 and selects, after carrier recovery, a signal output from a carrier recovering unit 27. Then the selector 2a sends a signal it selected to the C/N detector 25. Input switching is performed on the basis of a select signal.

Figure 19:
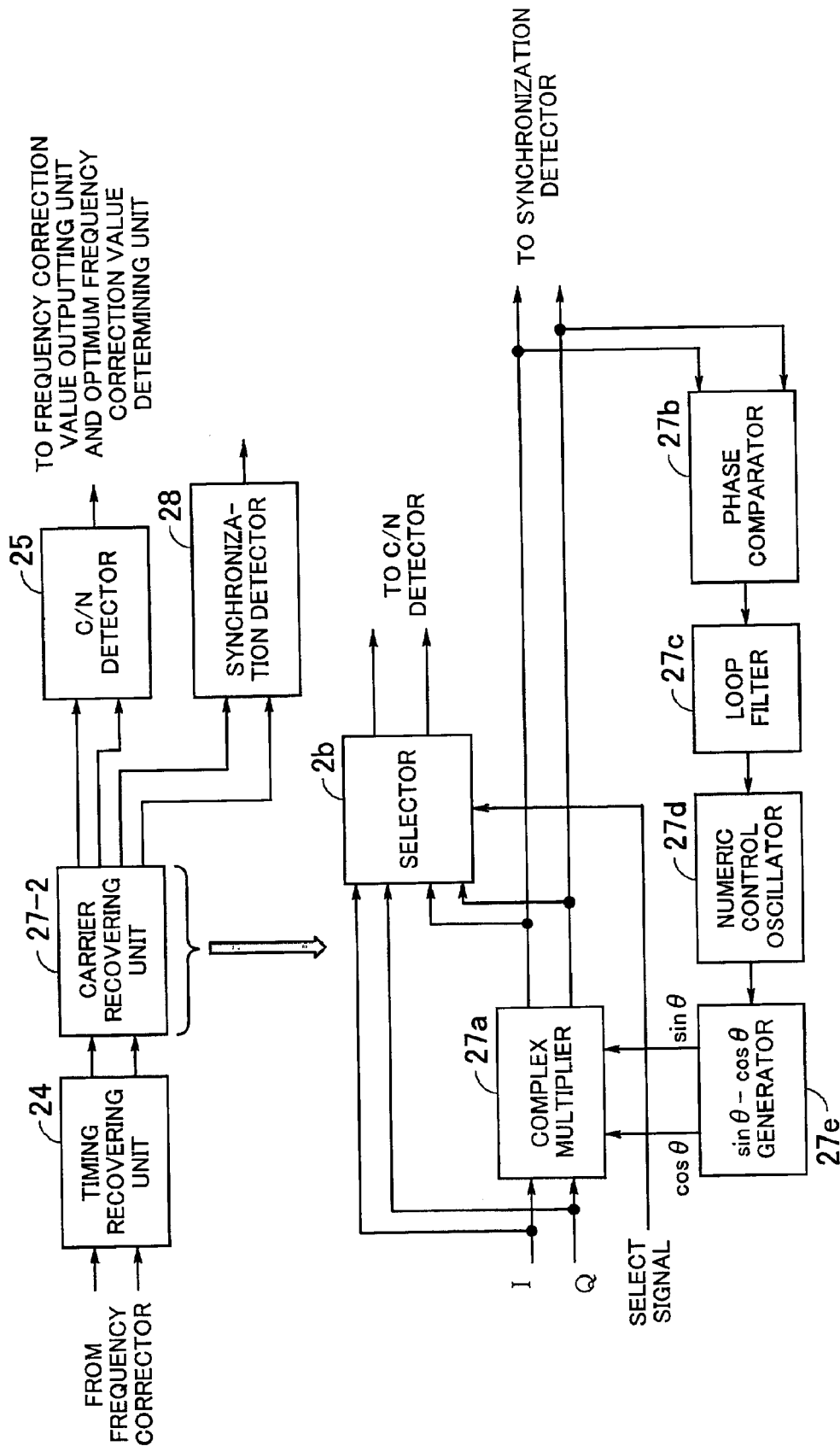
FIG. 19 shows an example of the configuration of control of C/N detection switching.

FIG. 19 shows an example of the configuration of control of C/N detection switching. FIG. 19 shows blocks around C/N detector 25 and the internal structure of carrier recovering unit 27-2. Components which are the same as those in FIGS. 1 and 4 are marked with the same symbols and descriptions of them will be omitted.

The C/N detector0 25 is connected to a first output of the carrier recovering unit 27-2 and a synchronization detector 28 is connected to a second output of the carrier recovering unit 27-2. A selector 2b is located in the carrier recovering unit 27-2. Before carrier recovery, the selector 2b selects a signal input to a complex multiplier 27a and outputs it to the C/N detector 25. After carrier recovery, the selector 2b selects a signal output from the complex multiplier 27a and outputs it to the C/N detector 25. Input switching is performed on the basis of a select signal.

The configurations shown in FIGS. 18 and 19 will enable to control efficiently switching between C/N at the time of demodulation control which depends on a carrier shift and C/N which does not depend on a carrier shift.

Figure 20:
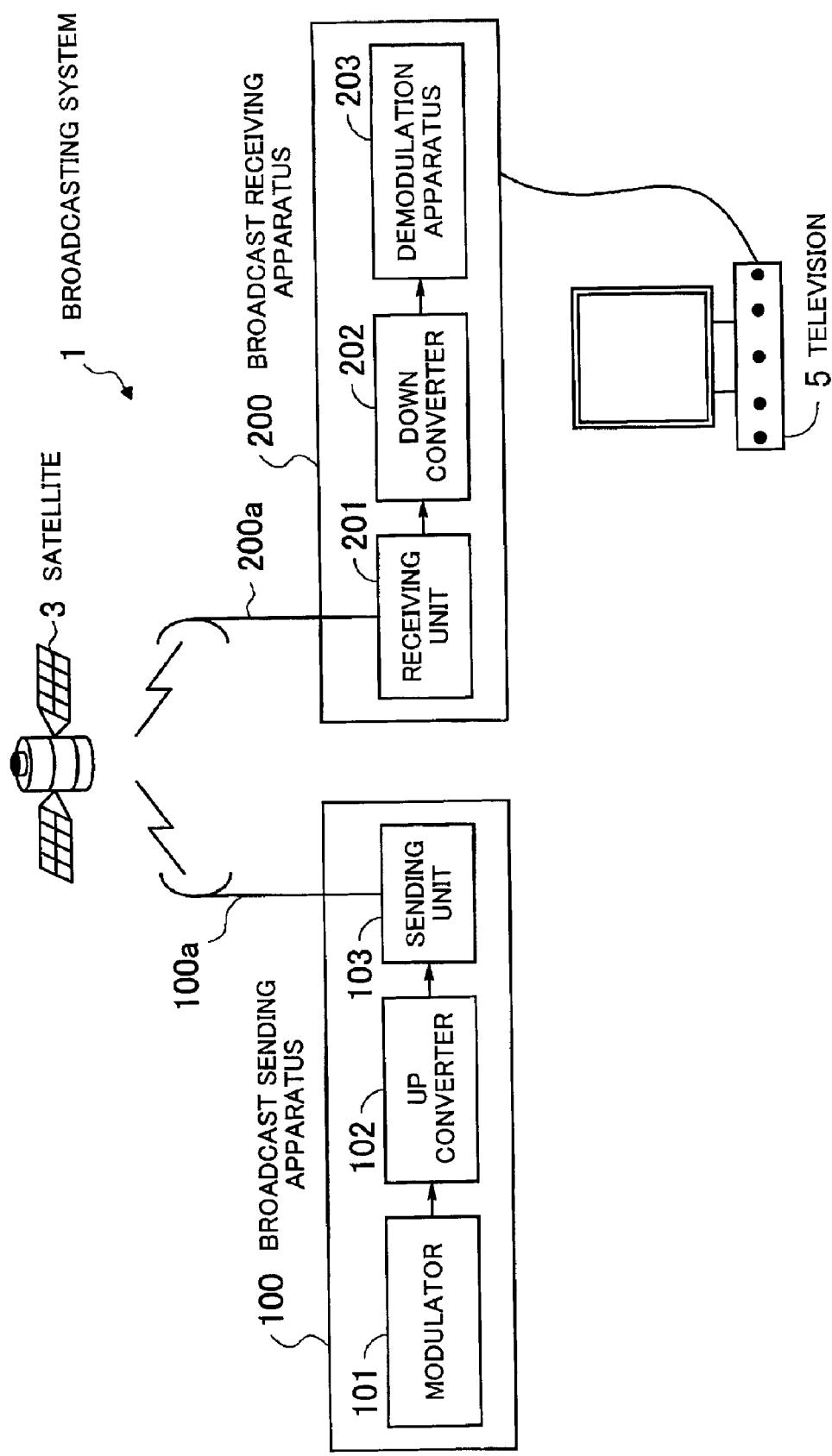
FIG. 20 is a view showing the rough configuration of a broadcasting system.
Figure 21:
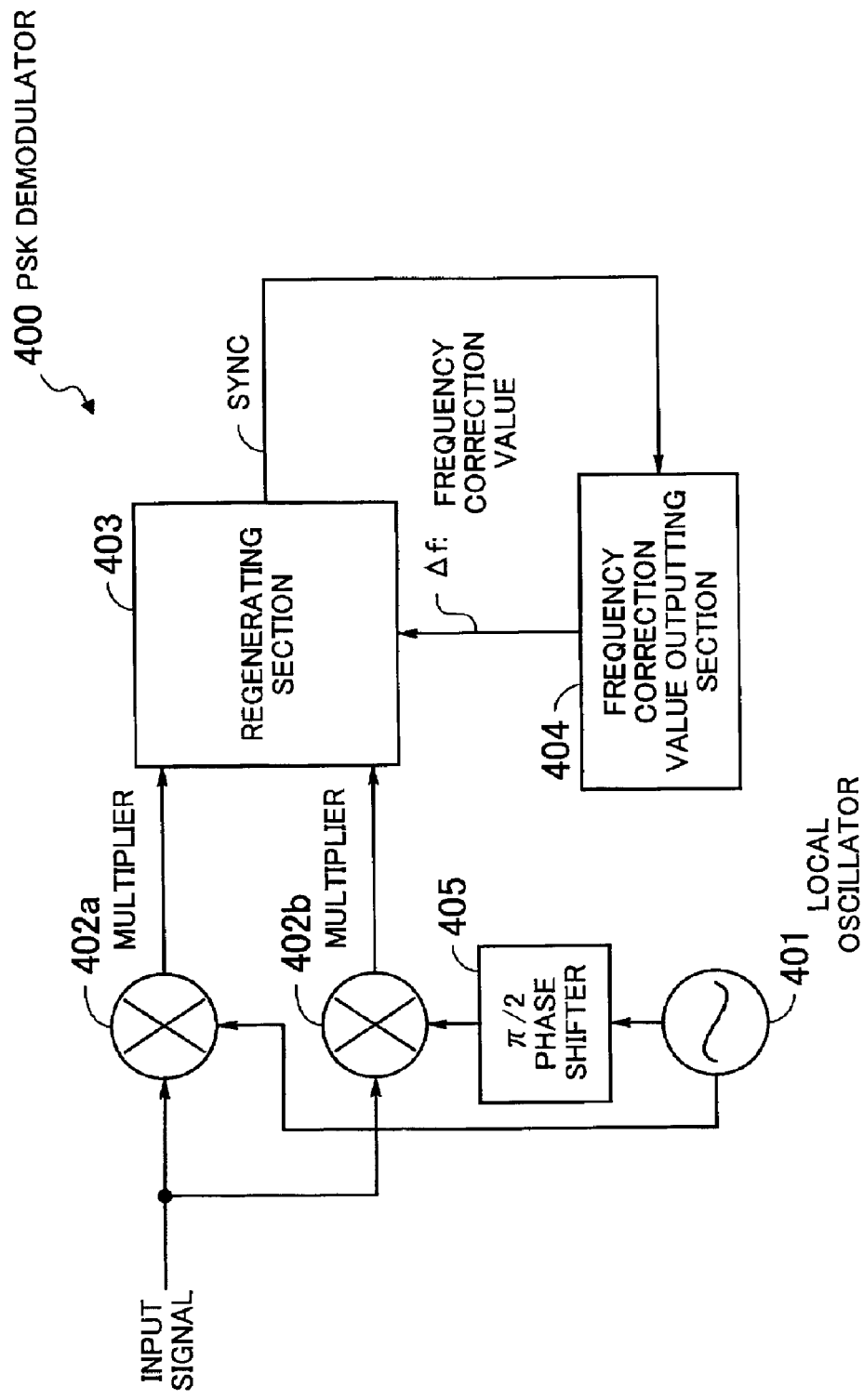
FIG. 21 is a view showing the rough configuration of a conventional PSK demodulator.

Now, a broadcasting system and a broadcast receiving apparatus to which a demodulation apparatus according to the present invention is applied will be described. FIG. 20 is a view showing the rough configuration of a broadcasting system. A broadcasting system 1 comprises a broadcast sending apparatus 100, a broadcast receiving apparatus 200 which a television 5 is connected to, and a satellite 3.

In the broadcast sending apparatus 100, a modulator 101 modulates a signal to be sent to generate a modulated signal. An up converter 102 converts the modulated signal into a radio signal. A sending unit 103 sends the radio signal to the satellite 3 via an antenna 100a.

In the broadcast receiving apparatus 200, a receiving unit 201 receives a signal via an antenna 200a which was sent from the satellite 3 to the ground and amplifies it with a low noise amplifier (LNA). In order to generate a signal to be demodulated, a down converter 202 converts the frequency of a signal the receiving unit 201 received and amplified (to a intermediate frequency band) and limits its band with a band pass filter (BPF).

A demodulation apparatus 203 (according to the first, second, or third embodiment of the present invention described above) controls the demodulation of a signal modulated on the sending side which is output from the down converter 202. Then a decoding section (not shown) performs, for example, an MPEG dynamic image regeneration process to generate regenerative data and sends it to the television 5. The television 5 displays a regenerated signal.

As described above, according to the present invention, demodulation can be performed quickly even if there exists a shift in carrier frequency being greater than a symbol frequency. Furthermore, C/N output after demodulation can be controlled so that it will not depend on the amount of a shift in carrier frequency.

In the above example, a demodulation apparatus according to the present invention is applied to a receiving apparatus for satellite communication, but it can be applied widely to other radio receiving apparatus.

As has been described in the foregoing, a demodulation apparatus according to the present invention performs carrier recovery by detecting C/N from a symbol after timing recovery, treating a frequency correction value corresponding to the maximum C/N value as the optimum frequency correction value, and correcting finally a shift in the frequency of a signal on which a frequency correction by the use of this optimum frequency correction value and timing recovery have been made. This will enable to shorten demodulation time and to perform efficient high-quality demodulation control.

Moreover, a broadcasting system according to the present invention performs carrier recovery on the broadcast receiving side by detecting C/N from a symbol after timing recovery, treating a frequency correction value corresponding to the maximum C/N value as the optimum frequency correction value, and correcting finally a shift in the frequency of a signal on which a frequency correction by the use of this optimum frequency correction value and timing recovery have been made. This will enable to shorten demodulation time and to perform efficient high-quality broadcast communication.

In addition, a broadcast receiving apparatus according to the present invention performs carrier recovery by detecting C/N from a symbol after timing recovery, treating a frequency correction value corresponding to the maximum C/N value as the optimum frequency correction value, and correcting finally a shift in the frequency of a signal on which a frequency correction by the use of this optimum frequency correction value and timing recovery have been made. This will enable to shorten demodulation time and to perform efficient high-quality broadcast receiving control.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A demodulation apparatus for demodulating modulated signals, the apparatus comprising:
    a digital signal generator for performing synchronous detection of a modulated input signal and for making an A/D conversion to generate digital signals corresponding to phase axes;
    a frequency correction value outputting unit for outputting a frequency correction value set on the basis of a symbol rate;
    a frequency corrector for giving a frequency offset to the digital signals on the basis of the frequency correction value to generate frequency-corrected signals;
    a timing recovering unit for performing timing recovery by extracting symbol timing for the frequency-corrected signals;
    a C/N detector for detecting C/N from a symbol obtained by the timing recovering unit;
    an optimum frequency correction value determining unit for treating a frequency correction value corresponding to the maximum value of the C/N as an optimum frequency correction value;
    a carrier recovering unit for performing carrier recovery by correcting finally a shift in the frequency of a signal on which a frequency correction by the use of the optimum frequency correction value and timing recovery have been made; and
    a synchronization detector for making an error correction on a symbol after carrier recovery and for detecting a unique word.

2. The demodulation apparatus according to claim 1, wherein the C/N detector detects C/N, in the case of performing carrier pull-in control, from a symbol which depends on the shift in frequency, and detects C/N, after carrier pull-in, from a symbol which does not depend on the shift in frequency.

3. The demodulation apparatus according to claim 1, wherein the C/N detector detects the C/N on the basis of dispersion in the direction of symbol amplitude.

4. The demodulation apparatus according to claim 1, wherein the frequency correction value outputting unit updates a frequency correction value by a frequency value being smaller than the pull-in range of the carrier recovering unit.

5. The demodulation apparatus according to claim 1, wherein the frequency correction value outputting unit updates a frequency correction value by a frequency value being greater than the pull-in range of the carrier recovering unit.

6. The demodulation apparatus according to claim 5, further comprising a shift detector for detecting the shift between a signal on which a frequency correction by the use of an optimum frequency correction value determined on the basis of the frequency correction value greater than pull-in range and timing recovery have been made and the pull-in range of the carrier recovering unit.

7. The demodulation apparatus according to claim 1, wherein the frequency correction value outputting unit outputs a frequency correction value being greater than the pull-in range of the carrier recovering unit before determination of the optimum frequency correction value and outputs, on the basis of a synchronization detection signal, a frequency correction value being smaller than the pull-in range after determination of the optimum frequency correction value.

8. A broadcasting system for communicating digital satellite broadcasts, the system comprising:
    a broadcast sending apparatus including:
        a modulator for modulating a signal to be sent to generate a modulated signal,
        an up converter for converting the modulated signal to a radio signal, and
        a sending unit for sending the radio signal to a satellite via an antenna; and
    a broadcast receiving apparatus including:
        a receiving unit for receiving a signal sent from the satellite to the ground,
        a down converter for converting the frequency of a signal received to generate a signal to be demodulated,
        a digital signal generator for performing synchronous detection of a signal output from the down converter which was modulated on the sending side and for making an A/D conversion to generate digital signals corresponding to phase axes,
        a frequency correction value outputting unit for outputting a frequency correction value set on the basis of a symbol rate,
        a frequency corrector for giving a frequency offset to the digital signals on the basis of the frequency correction value to generate frequency-corrected signals,
        a timing recovering unit for performing timing recovery by extracting symbol timing for the frequency-corrected signals,
        a C/N detector for detecting C/N from a symbol obtained by the timing recovering unit,
        an optimum frequency correction value determining unit for treating a frequency correction value corresponding to the maximum value of the C/N as an optimum frequency correction value,
        a carrier recovering unit for performing carrier recovery by correcting finally a shift in the frequency of a signal on which a frequency correction by the use of the optimum frequency correction value and timing recovery have been made, and
        a synchronization detector for making an error correction on a symbol after carrier recovery and for detecting a unique word.

9. A broadcast receiving apparatus for demodulating modulated signals for a digital satellite broadcast, the apparatus comprising:
    a receiving unit for receiving a signal sent from a satellite to the ground;
    a down converter for converting the frequency of a signal received to generate a signal to be demodulated;
    a digital signal generator for performing synchronous detection of a signal output from the down converter which was modulated on the sending side and for making an A/D conversion to generate digital signals corresponding to phase axes;

a frequency correction value outputting unit for outputting a frequency correction value set on the basis of a symbol rate;

a frequency corrector for giving a frequency offset to the digital signals on the basis of the frequency correction value to generate frequency-corrected signals;

a timing recovering unit for performing timing recovery by extracting symbol timing for the frequency-corrected signals;

a C/N detector for detecting C/N from a symbol obtained by the timing recovering unit;

an optimum frequency correction value determining unit for treating a frequency correction value corresponding to the maximum value of the C/N as an optimum frequency correction value;

a carrier recovering unit for performing carrier recovery by correcting finally a shift in the frequency of a signal on which a frequency correction by the use of the optimum frequency correction value and timing recovery have been made; and a synchronization detector for making an error correction on a symbol after carrier recovery and for detecting a unique word.

* * * * *